(12) United States Patent
Dahi Taleghani

(10) Patent No.: US 12,168,922 B2
(45) Date of Patent: Dec. 17, 2024

(54) APPARATUS AND PROCESS FOR FRACTURE CONDUCTIVITY TUNING

(71) Applicant: The Penn State Research Foundation, University Park, PA (US)

(72) Inventor: Arash Dahi Taleghani, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/363,003

(22) Filed: Aug. 1, 2023

(65) Prior Publication Data

US 2024/0102372 A1 Mar. 28, 2024

Related U.S. Application Data

(60) Provisional application No. 63/422,178, filed on Nov. 3, 2022, provisional application No. 63/407,426, filed on Sep. 16, 2022.

(51) Int. Cl.
*E21B 43/267* (2006.01)
*C09K 8/80* (2006.01)

(52) U.S. Cl.
CPC .............. *E21B 43/267* (2013.01); *C09K 8/80* (2013.01); *Y02E 10/10* (2013.01)

(58) Field of Classification Search
None
See application file for complete search history.

(56) References Cited

U.S. PATENT DOCUMENTS

| 11,434,740 B1* | 9/2022 | Nguyen | E21B 43/26 |
| 2016/0137912 A1* | 5/2016 | Sherman | C09K 8/80 |
| | | | 166/243 |
| 2021/0207467 A1* | 7/2021 | Nguyen | C09K 8/74 |

OTHER PUBLICATIONS

Fan H, Zhang L, Wang R, Song H, Xie H, Du L, et al. Investigation on geothermal water reservoir development and utilization with variable temperature regulation: a case study of China. Paper ID APEN-MIT-2019_286, Applied Energy Symposium: Mit A+B, May 22-24, 2019, Boston, USA.
Karimi-Fard M, Durlofsky LJ, Aziz K. An Efficient Discrete-fracture Model Applicable for General-purpose Reservoir Simulators. SPE J 2004; 9(02): 227-236.

* cited by examiner

*Primary Examiner* — Andrew Sue-Ako
(74) *Attorney, Agent, or Firm* — Buchanan Ingersoll & Rooney PC

(57) ABSTRACT

Tuning fracture hydraulic conductivity can be provided so that high hydraulic conductivity in high temperature zones and low hydraulic conductivity in low temperature zones can be defined in enhanced geothermal systems (EGS). Uniform thermal gradient along flow paths can be provided or defined to help provide such conductivity zones. Experimentation performed to evaluate embodiments showed that embodiments could prevent appearance of dominant flow paths between the wells and maintain high heat extraction rates. Embodiments can greatly increase cumulative heat extraction. Embodiments can also be provided for application solely to the injection wells. Other embodiments can position tuning agents between the wells and still help provide control of the fluid flow in the reservoir and enhance heat extraction.

22 Claims, 33 Drawing Sheets

APPARATUS AND PROCESS FOR FRACTURE CONDUCTIVITY TUNING

CROSS-REFERENCE TO RELATED APPLICATIONS

The present application claims priority to U.S. Provisional Patent Application Nos. 63/422,178, filed on Nov. 3, 2022, and 63/407,426, filed on Sep. 16, 2022. The entirety of these provisional patent applications are incorporated by reference herein.

STATEMENT REGARDING FEDERALLY SPONSORED RESEARCH

This invention was made with government support under Grant No. DE-EE0009791 awarded by the Department of Energy. The Government has certain rights in the invention.

FIELD

This innovation related to geothermal energy production systems, heat extraction from geothermal systems, devices and material for hydraulic conductivity tuning in fractures existing in such systems, and a process for fracture conductivity tuning that can be utilized in conjunction with geothermal wells, mineral extraction, waterflooding for oil reservoirs, and/or other systems.

BACKGROUND

Geothermal energy is a renewable source that can be used for both power generation and direct heating purposes. In general, the development of a geothermal reservoir relies on circulating a working fluid to extract heat from subsurface hot geological formations. Based on the method of heat extraction, geothermal systems can be divided into two categories: traditional geothermal (hydrothermal) systems and enhanced geothermal systems (EGSs).

In terms of traditional systems, hot water is produced from the subsurface, while the EGS are working based on the fluid circulation in the subsurface. Compared to conventional geothermal systems, the EGS has the advantage of extracting heat at higher rates over longer periods due to the artificial fractures induced in the hot rocks, which accommodate fluid replacement and circulation through them.

In recent years, EGSs are rapidly developing in several parts of the world, especially in the U.S. Since the Fenton Hill project in 1970s, several EGS projects are developed or approved in the U.S., including Raft River in Idaho, Geysers and Coso in California, Milford in Utah, as well as Brady and Desert Peak in Nevada.

SUMMARY

EGS operators often aim to extract heat at the maximum rate from a given volume of the reservoir. Stimulation techniques are often used to improve overall permeability and consequently heat extraction rates by faster water circulation. However, I have determined that these fractures may provide shortcuts for fast fluid travel between the wells and may not leave enough resident time for the working fluid to warm up (e.g., extract energy). In other words, while improved working fluid circulation between the wells is desired, I have determined that it could be more beneficial to also develop a mechanism for adjusting hydraulic conductivity through the various fractures within a subsurface to provide an improved circulation of working fluid for working fluid passing through fractures of a reservoir to provide a uniform heat extraction across the subsurface having those fractures. The uniform heat extraction can be a substantially same heat extraction (e.g. within 15% of being the same heat extraction, etc.) or the same heat extraction. The improved working fluid circulation can be provided by including material within the working fluid that can be temperature sensitive for adjustment of the hydraulic conductivity of the fluid passing through the fractures. The adjustment can permit a slowing down of the working fluid passing through hotter fractures or reduction in amount of working fluid passable through those hotter fractures so that working fluid passing through cooler fractures is increased to provide similar rates of heat extraction through all the fractures of a subsurface through which the working fluid is passed.

By making the heat extraction uniform, I mean a flow system that gives similar travel time (resident time) for different streamlines as the fluid travels from at least one injection well to at least one production well via a network of fractures within a reservoir between the injection well(s) and the production well(s). In the absence of such systems, fast flow rates through wide fractures would cool off the formation rock around main fractures very quickly while other portions of the reservoir may not have much fluid flow and, consequently, may remain hot. Tuning fracture conductivity can be provided by use of special proppants, adjustable clogging material (ACM) having a temperature sensitive solubility, or other mechanisms to help define adjustable hydraulic conductivity for the working fluid based on the surrounding temperature of the fractures the fluid is passed through to provide a uniform heat extraction or a similar heat extraction through the various fractures of the subsurface. The proppants, ACM, or other material can be configured to reduce an amount of working fluid passed through a particular hot fracture so that cooler fractures receive more working fluid to help provide a more uniform heat extraction, for example.

Hydraulic conductivity of a fracture can be proportional to the cubic of its width. Hence a bit wider fracture could have a much larger hydraulic conductivity. The fact that geological formations possess heterogeneities and often anisotropies that can make adjusting fracture conductivity a cumbersome or basically an impossible task can also be considered. Embodiments of my fracture conductivity tuning process and apparatus can be provided so that a uniform or substantially uniform thermal gradient can be defined along the reservoir.

Some embodiments can be configured so that fracture conductivity can be adjusted at any point based on the surrounding temperatures in that point so that the working fluid (e.g. water) can have shorter resident time in hotter spots and longer travel time along cold fractures to help ensure, or provide, uniform heat extraction across the reservoir volume as the working fluid is passed through fractures of a reservoir between at least one injection well and at least one production well.

Induced and natural fractures with high conductivity could develop some dominant flow paths for fluid flow, which might lead to the problems like early thermal breakthrough. The ability to control flow of fluids through and throughout the created or pre-existing fracture networks in the reservoir can therefore be an important aspect for pursuing implementation of an embodiment of my process or apparatus.

In particular, one significant advantage that embodiments can provide is that many implementations can be provided even without much information (or high uncertainty) about the geology or reservoir properties in which the embodiment may be employed. Embodiments can be adapted so that they can function independent of the reservoir geology. This can be particularly beneficial for systems in which the heterogeneities and/or anisotropies of a geological formation is entirely unknown or has significant unknown aspects for a particular system. Embodiments of the method and apparatus can be very effective in high risk areas or where a conventional geothermal method may have failed or been determined to be ineffective for that area.

One of the problems that can often be encountered in the EGS development is early thermal breakthrough. In this context, thermal breakthrough can refer to the fact that cold water from an injection well may breakthrough the hot reservoir and reach a production well without letting coming fluids be sufficiently heated up. In general, after the EGS reaches the thermal breakthrough, temperature of produced fluid would significantly decline and thus the EGS may not continue effectively extracting the heat from the reservoir, which can be destructive for the whole system. Great amounts of field evidence and numerical results suggest that the fluid flow between wells of EGS tends to localize into few fractures and then "short-circuit" the flow of working fluid. In this situation, early thermal breakthrough is very likely to occur very early.

Thermal breakthrough can be a complex function of many factors, including reservoir permeability, well spacing, injection and production rate, injection temperature, fractures geometry and fractures conductivity. Depending on the environmental conditions in individual projects, breakthrough time can vary from decades to months. Sometimes it could be even worse when intense fractures are created in the reservoir because the existence of induced fractures can not only enhance the fluid transmissivity but also can accelerate the thermal breakthrough. Due to the presence of various reasons behind an early thermal breakthrough, researchers have proposed different remedies to optimize the EGS operations to delay the thermal breakthrough.

For instance, in Fan H, Zhang L, Wang R, Song H, Xie H, Du L, et al. *Investigation on geothermal water reservoir development and utilization with variable temperature regulation: a case study of China*. Appl Energ 2020; 275: 115370, authors proposed a periodic operational scheme. They suggested that periodically shut-in after months of production could effectively delay the thermal breakthrough. However, the economic efficiency for this scheme highly depends on the balance between the shut-in time and operation time.

As another example, in Karimi-Fard M, Durlofsky L J, Aziz K. *An Efficient Discrete-fracture Model Applicable for General-purpose Reservoir Simulators*. SPE J 2004; 9(02): 227-236, it was recommended that larger well spacing and smaller fracture spacing for the EGS with multi-stage fractured horizontal well.

Although many optimization methods have been proposed in recent years, all these methods were mainly focused on the injection rate, well configuration, completion strategies and well spacing. These approaches typically failed to adjust the system and often required very reliable information about fractures and the reservoir which is often impossible to obtain or have.

I determined that embodiments of my process and apparatus for fracture conductivity tuning can provide controlling of fracture hydraulic conductivity that can have great potential as an alternative way for a practical optimization of EGS that can improve operation and performance of EGS. Currently, there is no effective way to control the direction of fracture paths or their conductivity to engineer the geometry of induced fractures in the subsurface. I have determined that embodiments of my process and apparatus can be configured to provide a large benefit to control the hydraulic conductivity of these fractures autonomously. Embodiments of my process and apparatus can be configured to provide control of hydraulic conductivity independent of the geometry or direction of fractures as well.

A method of fracture conductivity tuning can be provided. The method can include positioning elements in a geological system for adjustable hydraulic conductivity based on surrounding temperature of fractures within a subsurface of the geological system to provide a uniform or substantially uniform heat extraction from working fluid passed through the fractures.

Embodiments of the method can include injecting thermally sensitive proppants and/or adjustable clogging material (ACM) into the fractures, an injection well in fluid communication with the fractures, and/or a production well in fluid communication with the fractures. Embodiments can also include injecting proppants or other material after the thermally sensitive proppants and/or ACM are injected to position the ACM and/or thermally sensitive proppants in a location within the subsurface of the geological system, the injection well(s), the fractures, and/or the production well(s).

For example, in some embodiments, the elements can be or include thermally sensitive proppants and the positioning of the elements in the geological system can include injecting the thermally sensitive proppants into the fractures, at least one injection well in fluid communication with the fractures, and/or at least one production well in fluid communication with the fractures.

In some embodiments, the thermally sensitive proppants can be thermally sensitive coated proppants. In alternative embodiments, the thermally sensitive proppants can include a body that is comprised of a thermally sensitive material or an ACM. Embodiments of the ACM can be configured to have a negative overall thermal expansion coefficient.

The thermally sensitive proppants can be configured so that the thermally sensitive proppants deform to expand when the surrounding temperature is below a first preselected maximum temperature for a first temperature zone and are configured to be smaller when at a second preselected temperature that is above a second pre-selected minimum temperature for a second temperature zone. The first temperature zone can be a low temperature zone or a low conductivity zone and the second temperature zone is a high temperature zone or a high conductivity zone.

Solubility can increase gradually with temperature and can decrease vice-versa. Embodiments of the ACM can be configured to selected so that the solubility of the ACM can decrease drastically when temperature drops below an effective range and can increases quickly as temperature increases to operatable ranges. These temperature ranges can be pre-selected, or pre-determined, based on power generator types used in the surface as well as geology and other factors It should be appreciated that the ACM can be utilized such that the ACM can be injected with the working fluid and can also be included in the fluid output from at least one production well when the ACM is in its solution state.

The thermally sensitive proppants can include a thermally sensitive material and/or a coating comprised of a thermally sensitive material. In some embodiments, the thermally sensitive material can comprise calcium carbonate. Other embodiment can utilize other suitable thermally sensitive material as well.

The thermally sensitive proppants can be configured to remain at a first size when the surrounding temperature is at the second pre-selected temperature and can be enlarged to have a second size that has a greater volume than the first size when the surrounding temperature is below the first pre-selected maximum temperature for the first temperature zone.

In some embodiments, deformation of the thermally sensitive proppants can be adapted to occlude the fractures and diminish hydraulic conductivity when the surrounding temperature is in the first temperature zone.

In some embodiments, the geological system can be an enhanced geothermal system (EGS) or a geothermal system. The geological system can include at least one reservoir that can include an overburden and an underburden. At least one injection well and at least one production well can be in fluid communication with fractures of the reservoir. The reservoir can be a portion of the subsurface of the geological system and can include rock and other subsurface material.

Embodiments of the method can include injecting the thermally sensitive proppants into at least one injection well, into at least one production well, and/or into the fractures in some embodiments. In other embodiments, other elements (e.g. ACM) can be injected into at least one injection well, into at least one production well, and/or into the fractures.

As noted above, the method can also include other steps. For example, the method can include injecting additional proppants to position the thermally sensitive proppants and/or ACM in the fractures between the injection well(s) and the production well(s) so the thermally sensitive proppants are positioned in the fractures at a location that is remote from the injection well and also positioned at a location that is remote from the production well(s).

In some embodiments, the adjustable clogging material (ACM) can have a temperature sensitive solubility such that the ACM can be dissolved in a liquid (e.g. (e.g. in a solution state via being dissolved in the liquid) when at or above a first temperature and in a solid state at or below a second temperature that is lower than the first temperature. For example, the ACM can be configured to be in a solid state when the surrounding temperature is below a first pre-selected maximum temperature for a first temperature zone and can be configured to be dissolved within a working fluid (e.g. solubilized within a liquid, dissolved into a liquid working fluid, etc.) when at a second pre-selected temperature that is above a second pre-selected minimum temperature for a second temperature zone. The selection of the first pre-selected maximum temperature and the second pre-selected minimum temperatures can be selected so ACM solubility is adjusted at the first pre-selected maximum temperature so substantial portion (e.g. greater than 80% to 100% of the ACM), if not all, of the ACM is in a solid state (e.g. principates out of working fluid) at or above first pre-selected maximum temperature and a substantial portion (e.g. greater than 80% to 100% of the ACM), if not all, of the ACM is in solution state (e.g. solubilized in the working fluid) when the temperature is at the second pre-selected minimum temperature.

The first temperature zone can be a low temperature zone or a low conductivity zone and the second temperature zone can be a high temperature zone or a high conductivity zone. Embodiments of the ACM can include inorganic salts, polymers or organic salts that may have such solubility properties for a working fluid (e.g. water), for example.

In some embodiments, the method can also include the ACM forming at least one lining in the fractures when the surrounding temperature is at or below the first temperature and at least one lining dissolving when the surrounding temperature is at or above the second temperature. It is notable that at lower temperature (e.g. a temperature below the first temperature), more linings may not be added but the existing lining can become thicker to reduce the conductivity. As the temperature warms, the lining may then become thinner and/or dissolve (e.g. when temperature is at or above the second temperature) to increase the conductivity.

An apparatus for fracture conductivity tuning can also be provided. Embodiments of the apparatus can be configured to perform an embodiment of my method. The apparatus can include an injection well and fractures communicatively connected to the injection well such that a working fluid injectable via the injection well passes through the fractures to a production well. The fractures can be defined in a reservoir, which can be a part of a subsurface of a geological system, for example. The apparatus can also include thermally expansive elements positioned in at least one injection well, the fractures and/or at least one production well to adjust fracture conductivity of heat to the working fluid. The thermally expansive elements can be configured to solidify to a solid or enlarge from a first size to a second size to have a greater volume when at a temperature that is below a first pre-selected temperature and the thermally expansive elements can be configured to liquefy (e.g. solubilize) or be at their first size when at a temperature that is above a second pre-selected temperature that is greater than the first pre-selected temperature.

The first pre-selected temperature can be a defined maximum temperature for a first zone of conductivity and the second pre-selected temperature can be a defined minimum temperature for a second zone of conductivity. The conductivity of the second zone can be a thermal conductivity that is greater than the thermal conductivity of the first zone.

In some embodiments, the thermally expansive elements are comprised of calcium carbonate and/or are adjustable clogging material (ACM) having a temperature sensitive solubility. In other embodiments, the elements can be proppants and each of the proppants can be comprised of a thermally sensitive coating that covers a body of the proppant. The proppants can be comprised of shape memory polymers or metal(s) in some embodiments. In yet other embodiments, the elements can be a combination of ACM, thermally sensitive proppants, and proppants having thermally sensitive coatings.

Other details, objects, and advantages of the invention will become apparent as the following description of certain present preferred embodiments thereof and certain present preferred methods of practicing the same proceeds.

BRIEF DESCRIPTION OF THE DRAWINGS

Exemplary embodiments of proppants, apparatuses and processes for fracture conductivity tuning, and methods of making and using the same are shown in the accompanying drawings. It should be appreciated that like reference numbers used in the drawings may identify like components.

is scheme 2 where b=150 m; (c) is scheme 3 where b=50 m; and (d) is scheme 4 where b=0 m.

Figure 26:
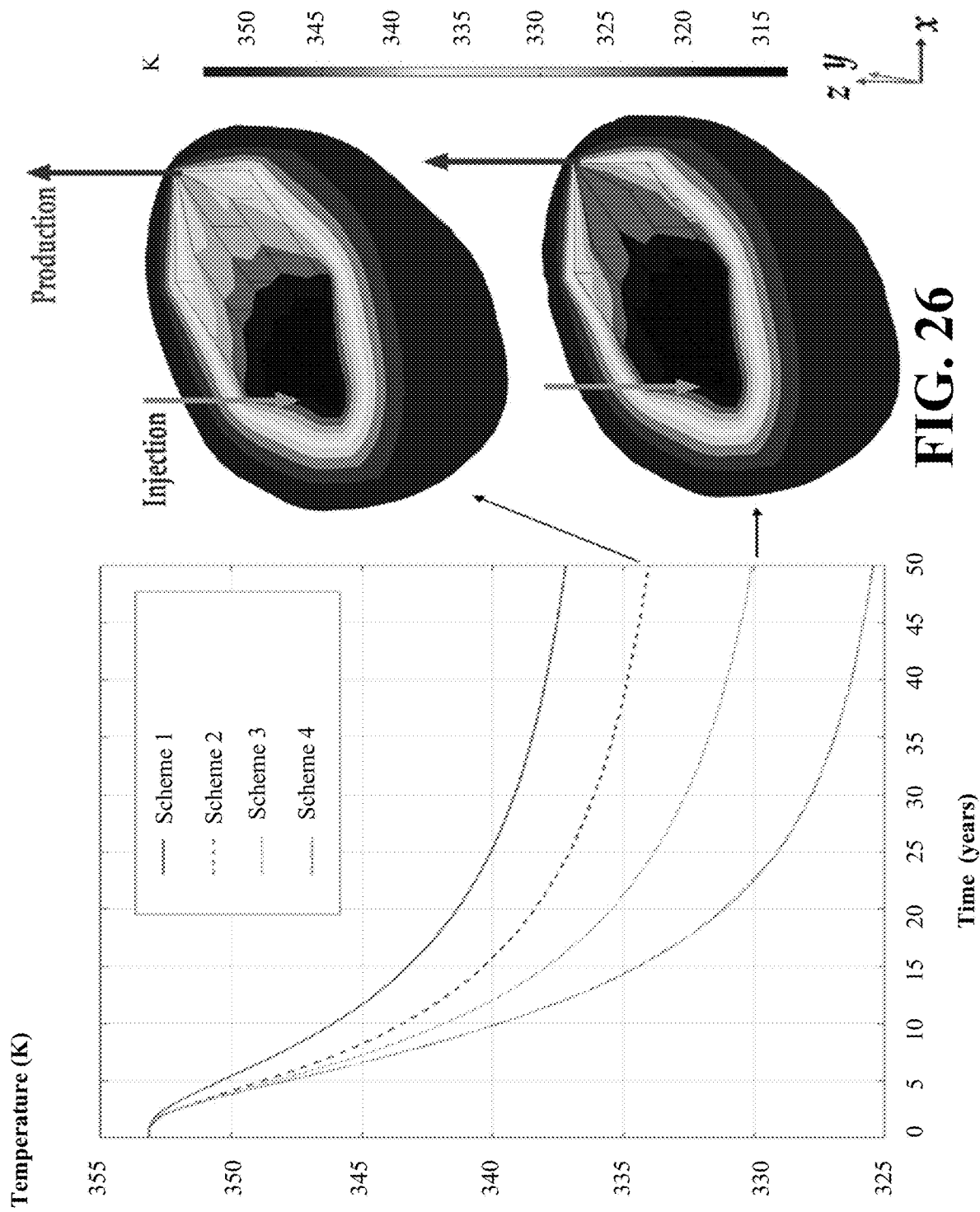

FIG. 26 is a graph illustrating simulation results for the temperature of produced fluid for different simulated scenarios where scheme 1 is where b=300 m; scheme 2 where b=150 m; scheme 3 where b=50 m; and scheme 4 where b=0 m.

Figure 27:
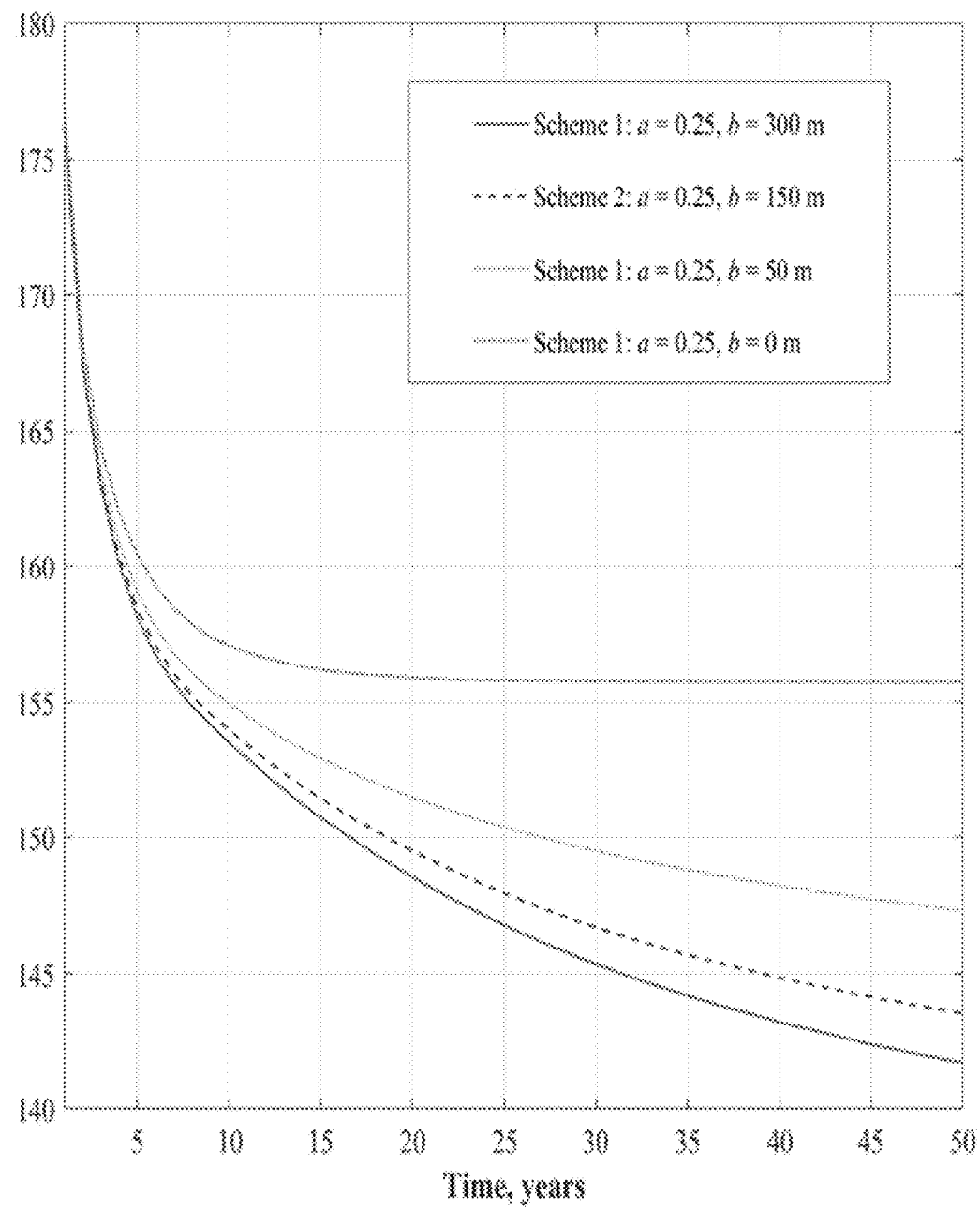

FIG. 27 is a series of graphs illustrating simulation results for the production rate for different simulated scenarios where scheme 1 is where b=300 m; scheme 2 where b=150 m; scheme 3 where b=50 m; and scheme 4 where b=0 m.

Figure 28:
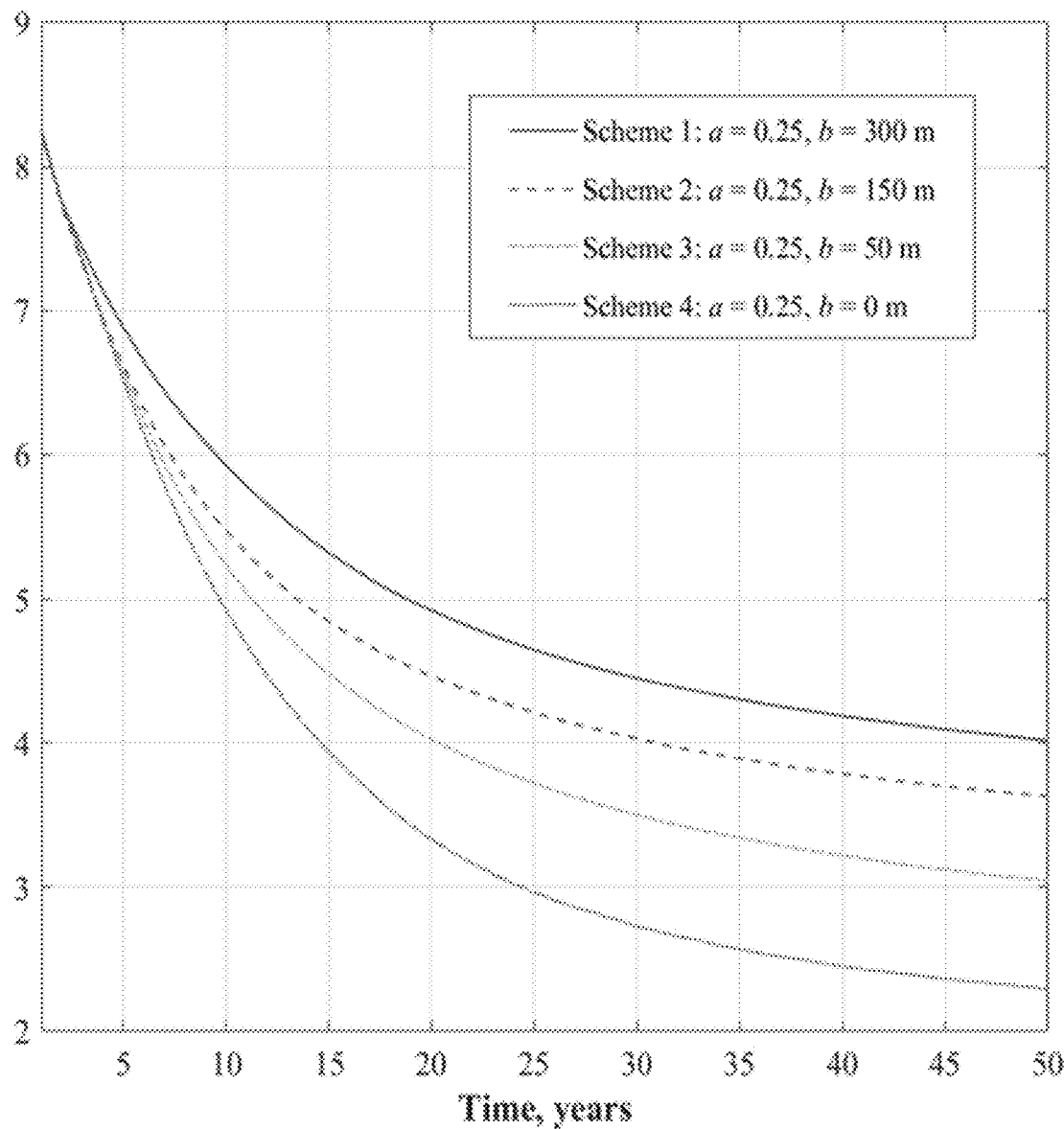

FIG. 28 is a graph illustrating simulation results for the output thermal power for different simulated scenarios where scheme 1 is where b=300 m; scheme 2 where b=150 m; scheme 3 where b=50 m; and scheme 4 where b=0 m.

Figure 29:
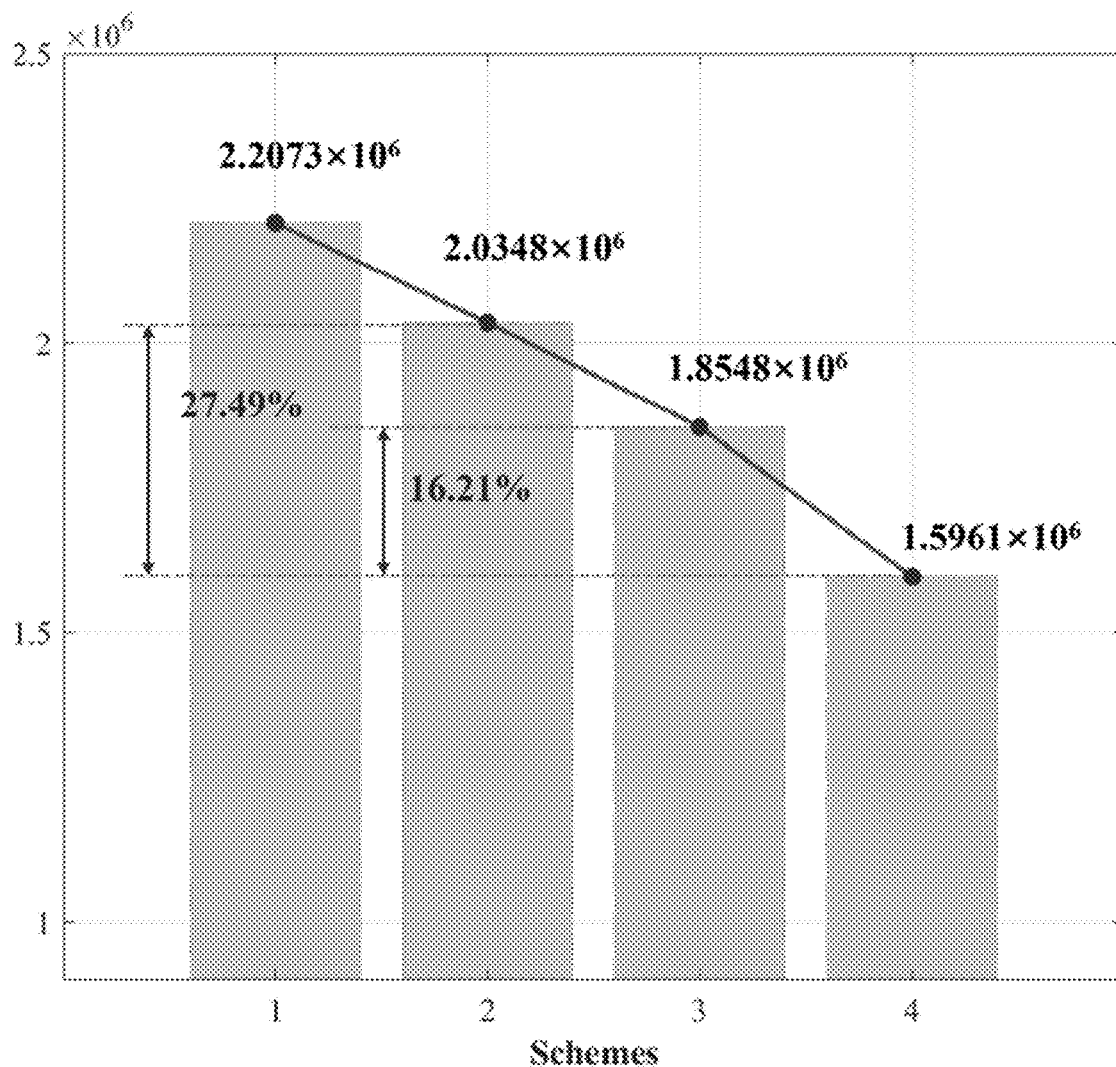

FIG. 29 is a graph illustrating simulation results for the cumulative output thermal power for different simulated scenarios where scheme 1 is where b=300 m; scheme 2 where b=150 m; scheme 3 where b=50 m; and scheme 4 where b=0 m.

Figure 30:
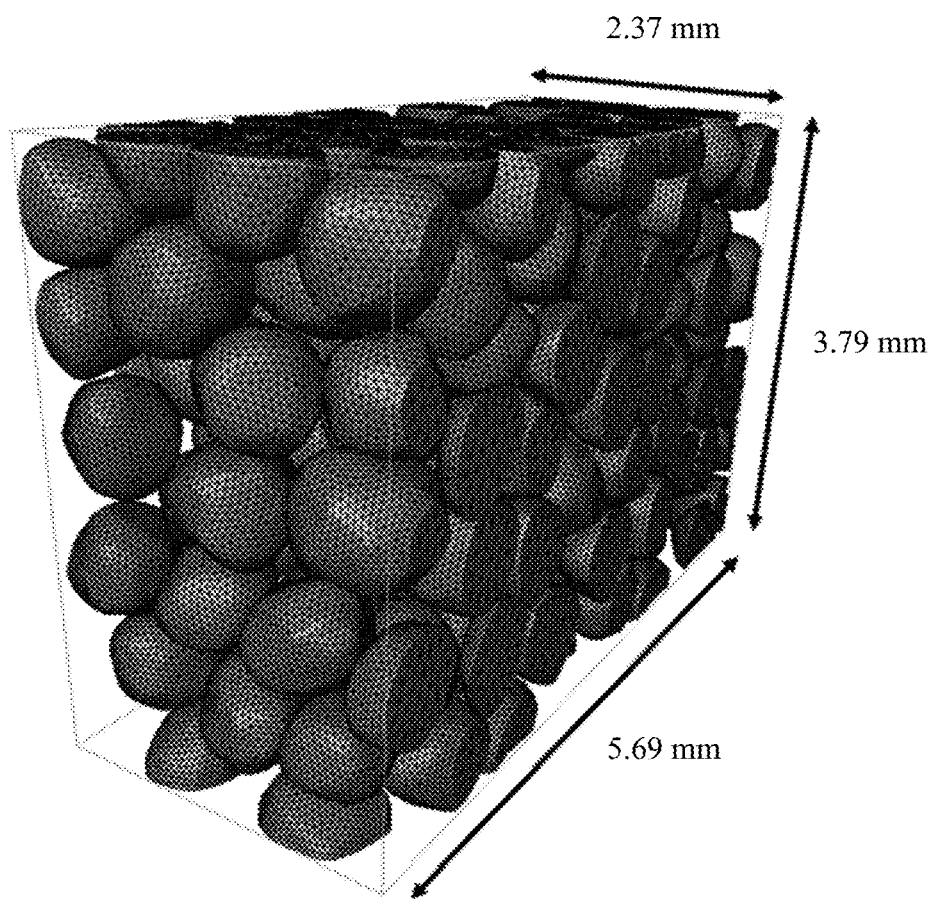

FIG. 30 is a schematic view of a rectangular sample that includes 221 non-spherical proppants that can be utilized in an embodiment of the apparatus and process for fracture conductivity tuning analyzed in conducted modeling discussed herein.

Figure 31:
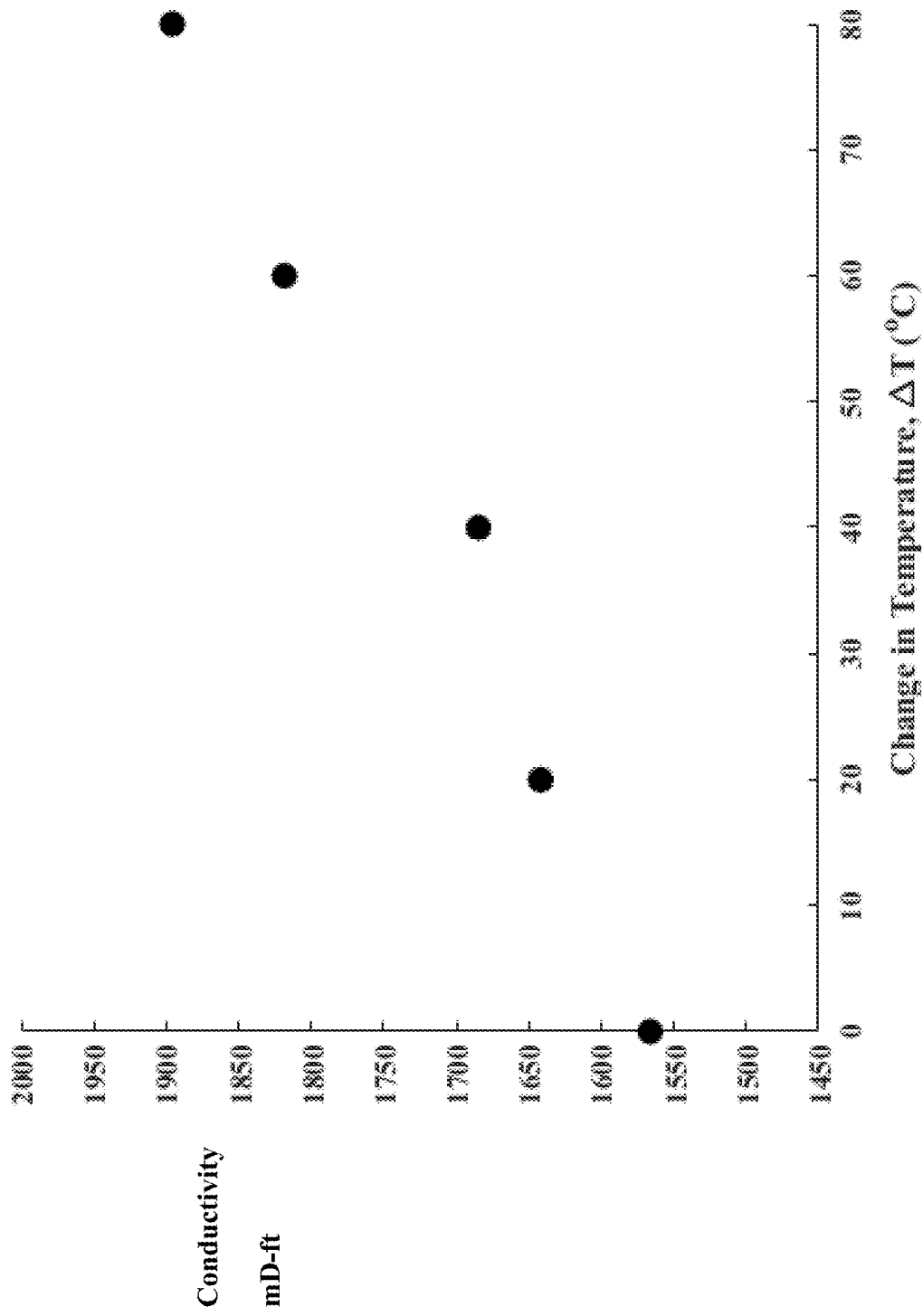

FIG. 31 is a graph illustrating proppant conductivity changes for the sample shown in FIG. 30 obtained from the conducted modeling showing changes in conductivity based on temperature.

Figure 32:
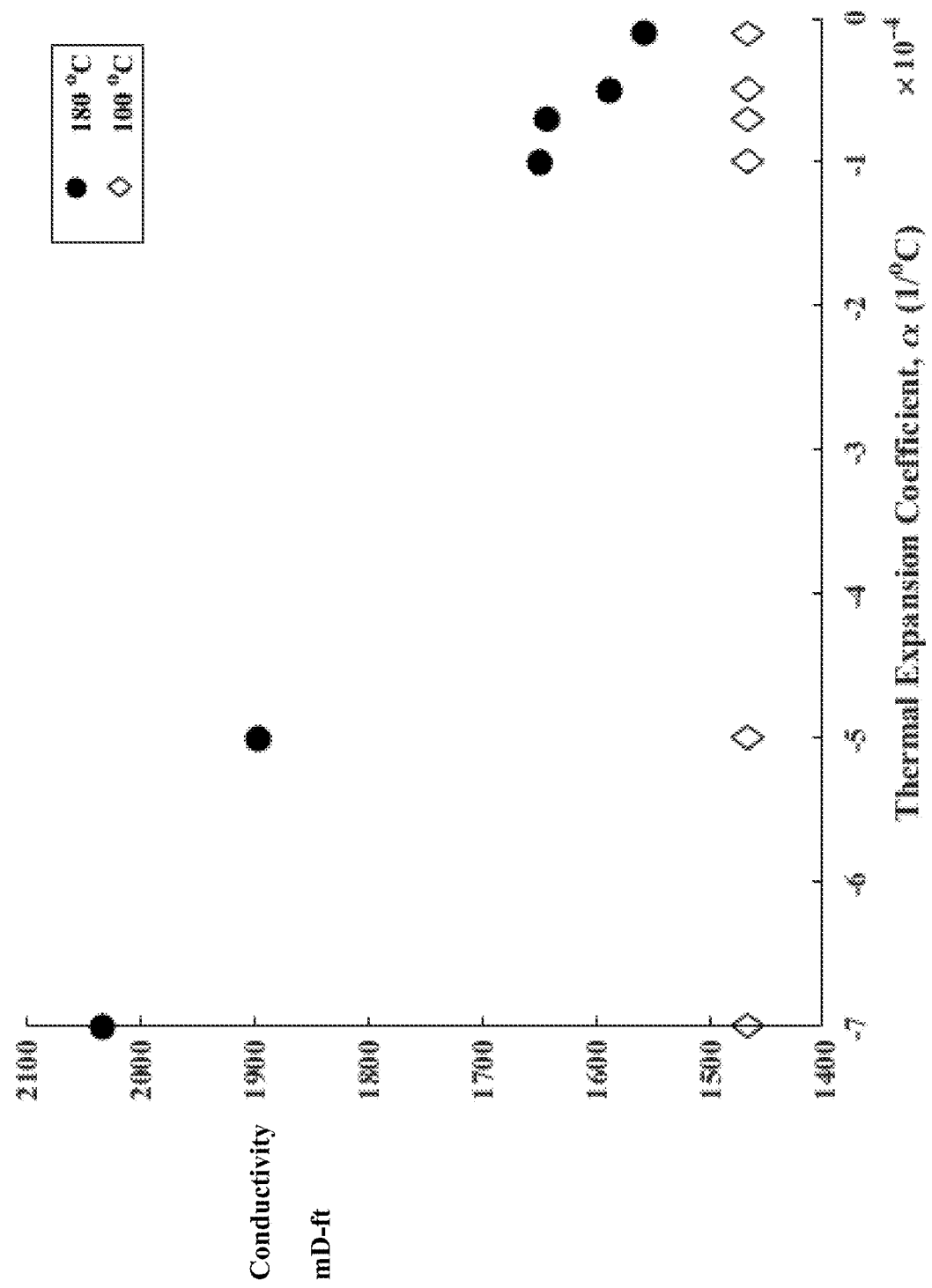

FIG. 32 is a graph illustrating proppant conductivity changes for the sample shown in FIG. 30 obtained from the conducted modeling showing changes in conductivity based on thermal expansion coefficient.

Figure 33:
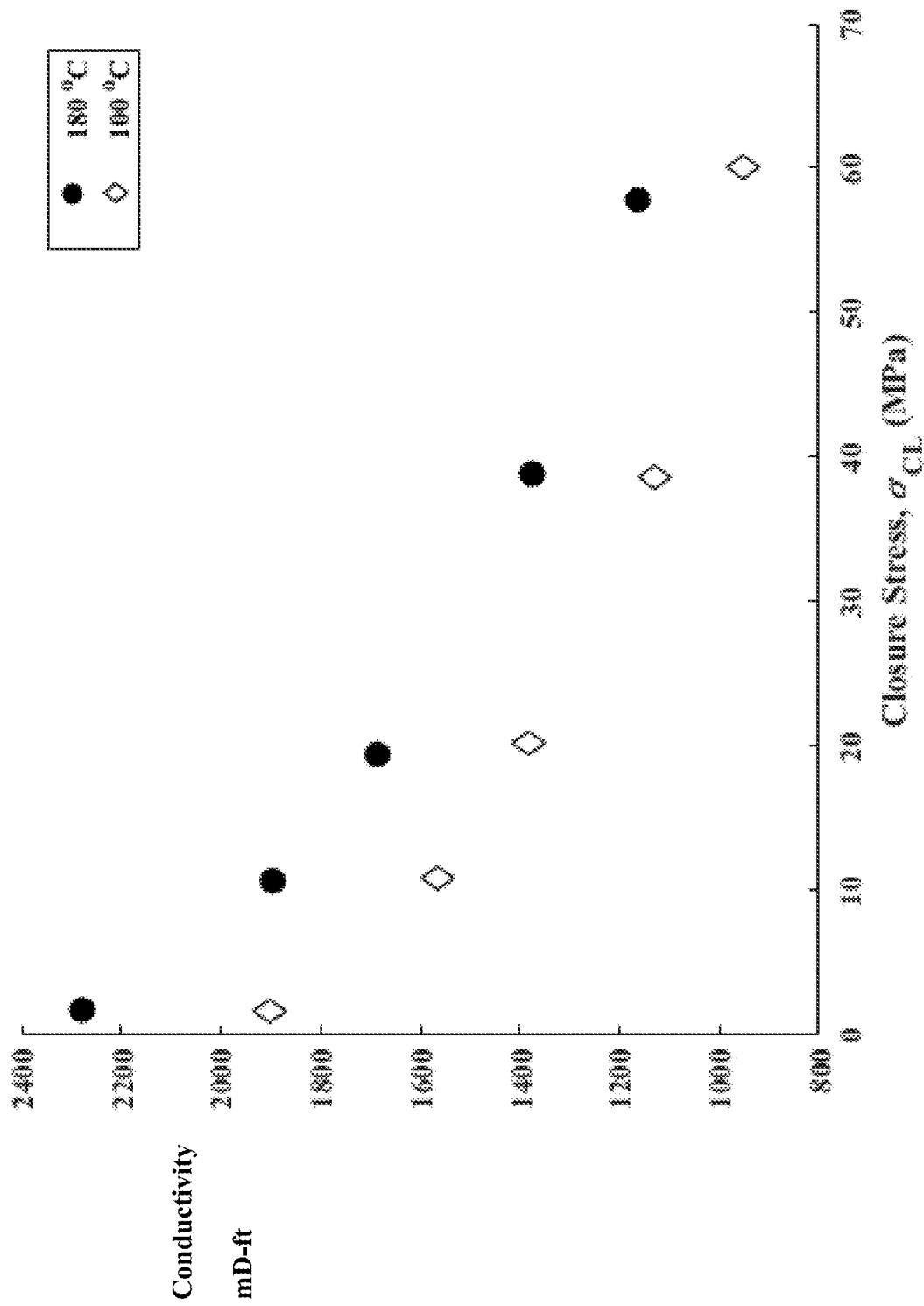

FIG. 33 is a graph illustrating proppant conductivity changes for the sample shown in FIG. 30 obtained from the conducted modeling showing changes in conductivity based on closure stress.

Figure 34:
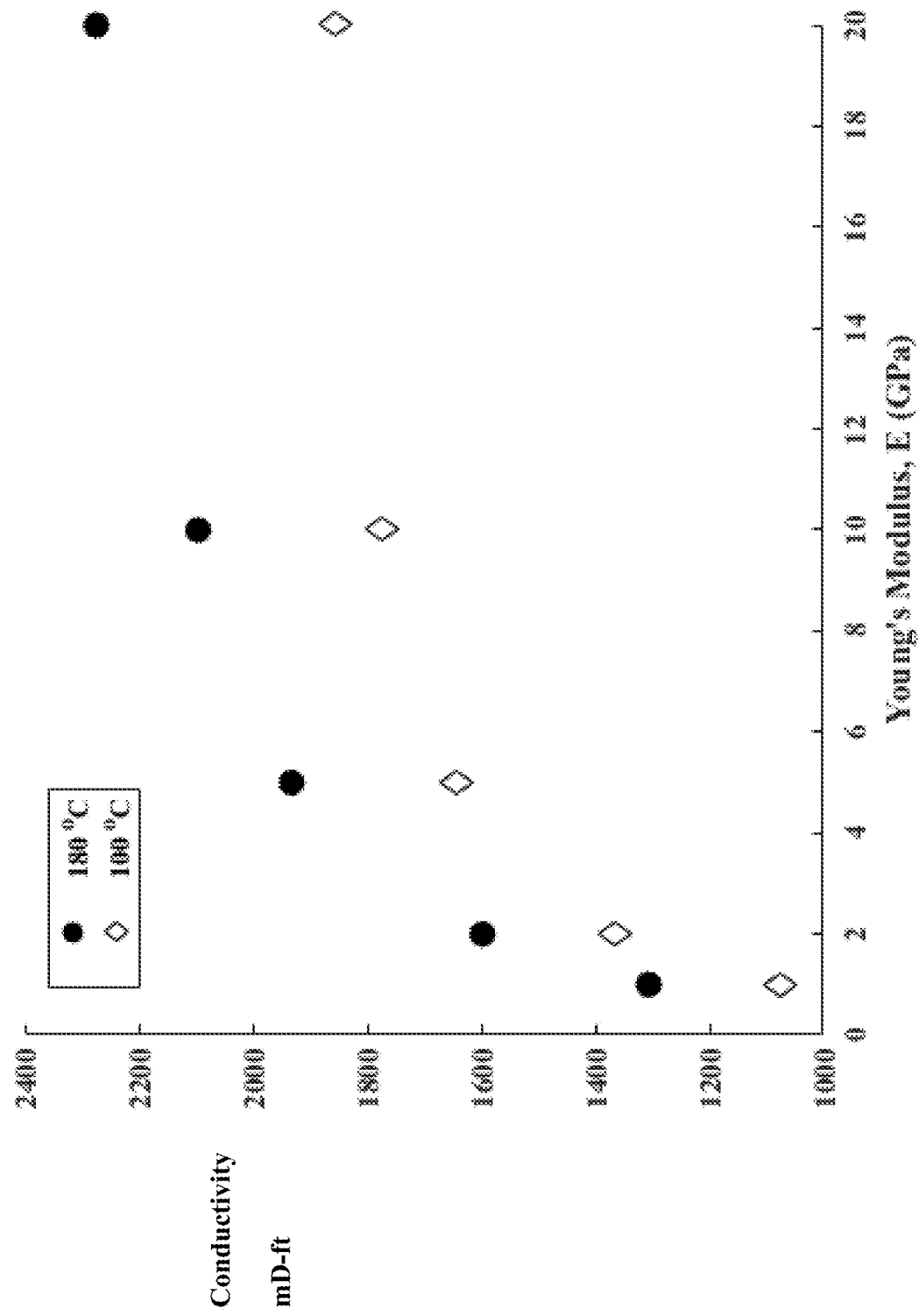

FIG. 34 is a graph illustrating proppant conductivity changes for the sample shown in FIG. 30 obtained from the conducted modeling showing changes in conductivity based on Young's Modulus (E, in GPa).

Figure 36:
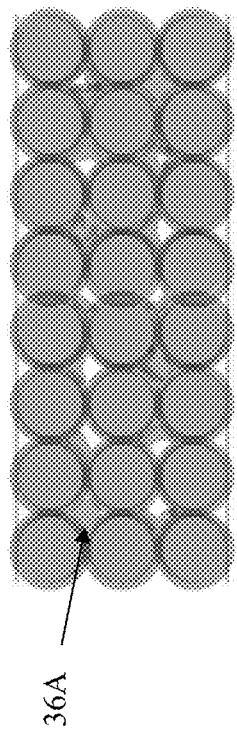
Figure 35:
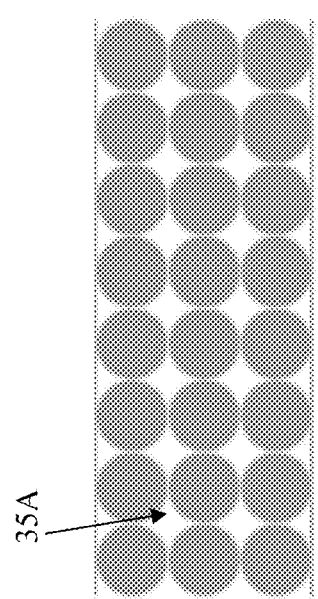

FIG. 35 is a schematic illustration of an exemplary fracture system with materials with temperature-sensitive solubility (e.g. ACM) within the circulation fluid passing through the fracture system at a high temperature in which the materials with temperature sensitivity are in an aqueous state within the circulating working fluid and pass through pores 35A of the fracture system to pass through the fracture system with high hydraulic conductivity. As discussed herein, the pores 35A may reduce in size via linings that may be formed when the surrounding temperature of the fracture system drops to a pre-selected temperature and the material having the temperature sensitive solubility precipitates into a solid state as shown in FIG. 36. This cycling can occur repeatedly based on the surrounding temperature of the fracture system to help tune the conductivity for the fractures.

FIG. 36 is a schematic illustration similar to FIG. 35 of the exemplary fracture system with materials with temperature-sensitive solubility (e.g. ACM) within the circulation fluid passing through the fracture system at a low temperature that is lower than the high temperature state of FIG. 35 such that the materials with temperature sensitivity have precipitated and are in a solid state at cold parts 36A of the fracture system to decrease the hydraulic conductivity of the working fluid passing through the pores of the fracture system to increase the residence time of the working fluid passing through the fracture system. As can be seen from a comparison of FIGS. 35 and 36, the precipitation that can be provided by the materials with temperature-sensitive solubility can cause linings along various colder pores of the fracture system that may not develop along hotter working fluid paths. As discussed herein, such linings that may form can dissolve and be removed so that the fracture can return to a state as shown in FIG. 35 when the surrounding temperature exceeds a pre-selected temperature and he temperature sensitive material is again dissolved into the working fluid. The changed state of the fracture system based on temperature can occur repeatedly in numerous different cycles based on the surrounding temperature of the fracture system.

As noted above and discussed herein, the reference numeral x used in the drawings is to identify an x-axis, the reference numeral y used in the drawings identifies a y-axis and the reference numeral z used in the drawings identifies a z-axis.

DETAILED DESCRIPTION

Figure 1:
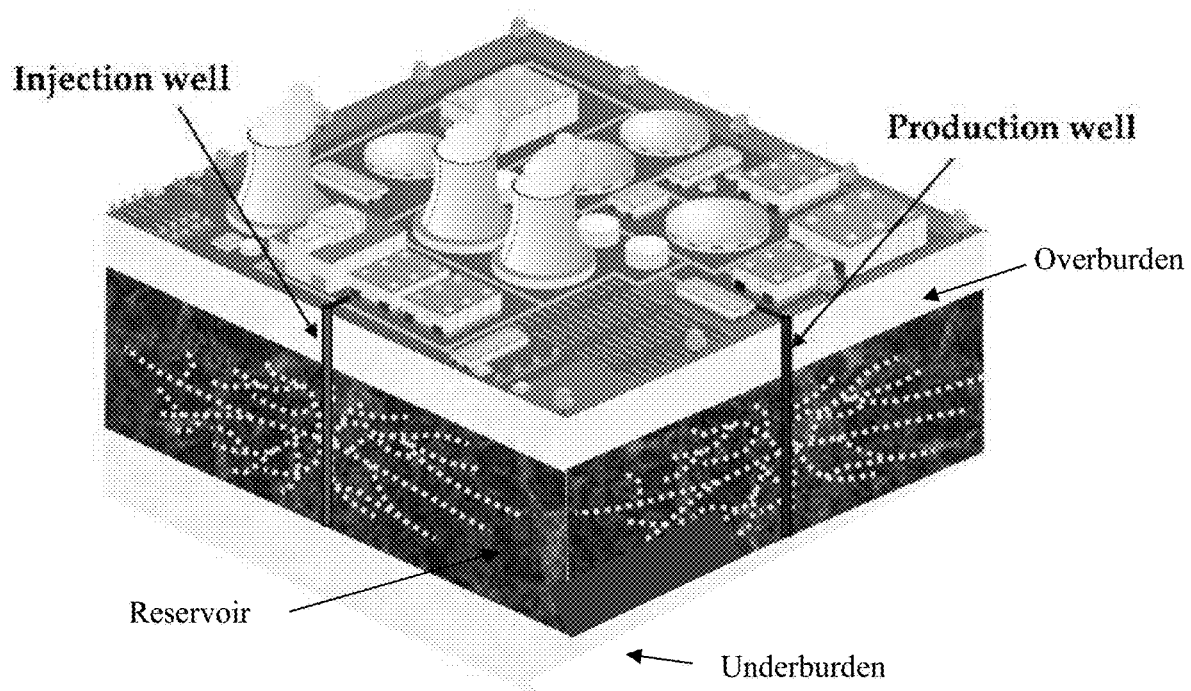
FIG. 1 is a perspective schematic view of an exemplary embodiment of a geothermal system that can utilize exemplary embodiments of the apparatus and process for fracture conductivity tuning.

A schematic illustration of an exemplary physical model for an embodiment of a geothermal system is shown in FIG. 1. This embodiment can be configured as an Enhanced Geothermal System (EGS).

Figure 2:
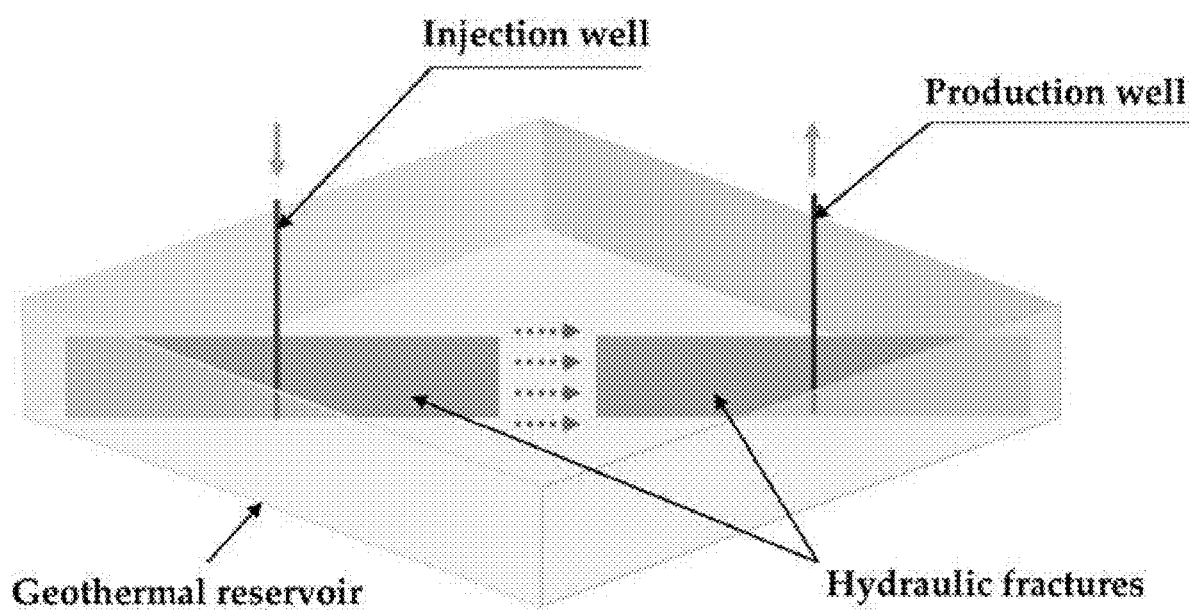
FIG. 2 is a schematic view of an exemplary heat extraction process that can be utilized in the embodiment shown in FIG. 1.

FIG. 2 provides a schematic illustration that helps illustrate a heat extraction process used in the embodiment of FIG. 1. As can be appreciated from FIGS. 1 and 2, a geothermal system can utilize circulation of working fluid (e.g. water, an aqueous solution that is substantially water, etc.), to extract heat. One or more injectors and one or more producers can be provided in the system. An injector can inject a working fluid (e.g. water, liquid water, etc.) into a reservoir at an injection well so that the working fluid passes through fractures within a reservoir to at least one production well. At least one production well can receive the heated working fluid (e.g. steam) after it has been heated by passing through the reservoir via flow paths defined in the reservoir by the fractures naturally formed in the reservoir or artificially induced in the reservoir.

Water or other types of working fluids can be injected into the reservoir from the one or more injection wells. Due to the hot environment of the reservoir, the injected working fluid (e.g. water, etc.) can be rapidly heated by the reservoir rock as it passes through the reservoir to the production well(s). The water can be injected as a liquid and output as steam in some embodiments. As the working fluid is passed through the reservoir, it can move along multiple different flow paths defined by fractures of a fracture network within the reservoir. Embodiments of my apparatus and process are configured to help define these different fracture flow paths so the heat extraction of heat obtained by the working fluid passed through the different flow paths are uniform or substantially uniform (e.g. are the same, are values that are within 5%-20% of each other, are relatively the same, etc.).

The extracted heat from the reservoir obtained via the heated working fluid received via the production well(s) can be used for electricity generation as shown in FIG. 1, for example. For instance, steam output via the production well(s) can be fed to one or more steam turbines for electricity generation.

Induced fractures can provide most of the heat and mass transfer for such embodiments. The schematic diagram that illustrates the hydraulic fracturing of FIG. 2 can help illustrate how, for each well in FIG. 1, a by-wing symmetrical hydraulic fracture can be identified which can significantly contribute to the fluid flow and heat transfer during the operation of the system. It should also be appreciated that induced fractures in the geothermal reservoir could be much more complicated than what is shown in FIGS. 1 and 2 due to the presence of natural fractures in the reservoir.

Figure 3:
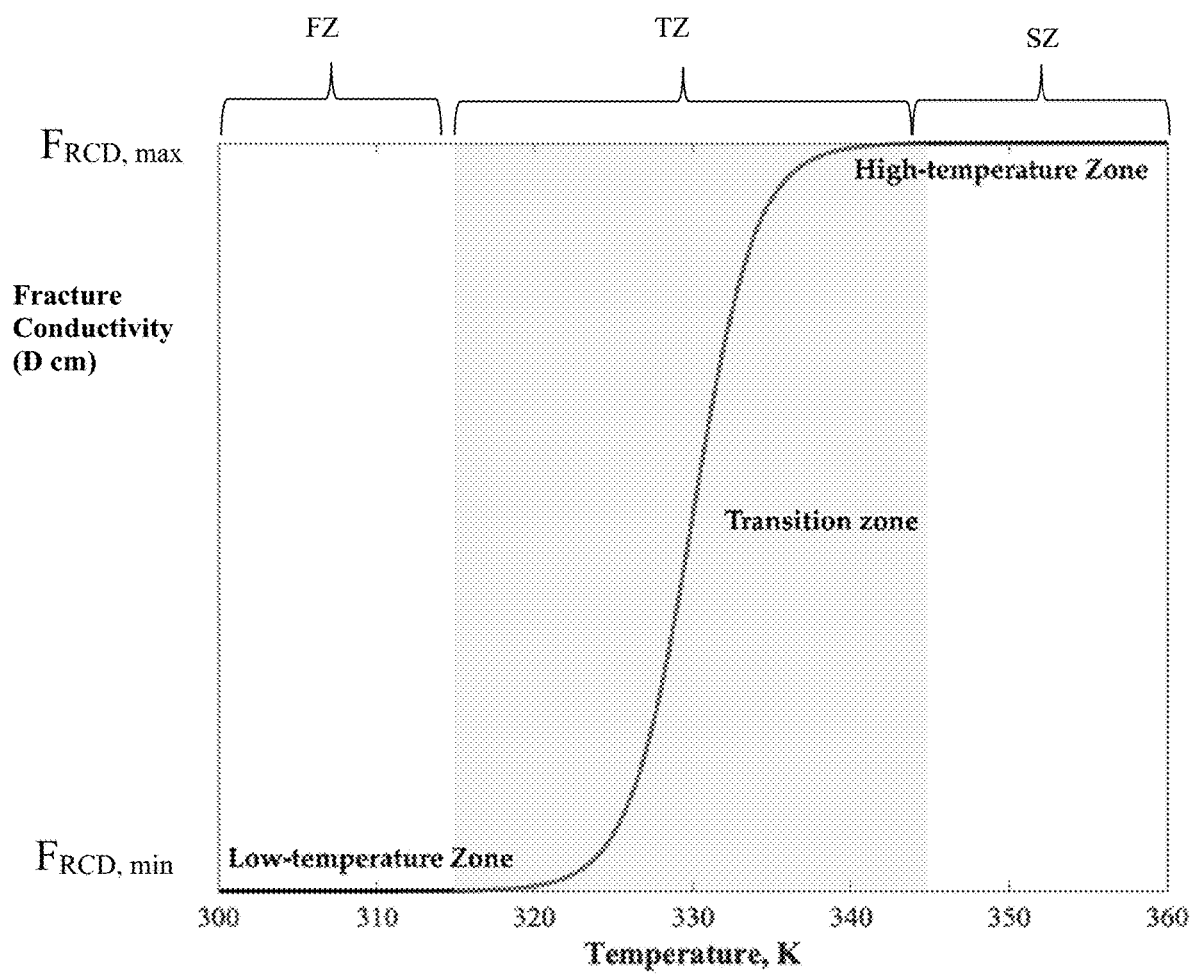
FIG. 3 is a graph illustrating exemplary temperature zones that can be defined for an exemplary embodiment of the process for fracture conductivity tuning that can be utilized in an exemplary embodiment of the apparatus for fracture conductivity tuning. The graph of FIG. 3 can help illustrate the relationship between temperature and fracture hydraulic conductivity.

To control fluid flow in the reservoir and enhance the efficiency of the geothermal system, an embodiment of my apparatus and/or process for fracture conductivity tuning can be utilized. Such embodiments can be configured so that high fracture hydraulic conductivity at high temperatures is provided while low hydraulic conductivity at low temperatures is also provided. FIG. 3 illustrates a series of conductivity zones that can be defined for use in such embodiments. The graph of FIG. 3 can help illustrate the relationship between temperature and fracture hydraulic conductivity.

As can be seen from FIG. 3, at least three different operation zones for the relationship between the temperature and fracture hydraulic conductivity can be pre-selected. In a first zone FZ (which can be a low-temperature zone), fracture hydraulic conductivity can be low and in a second zone SZ (e.g. a high-temperature zone), fracture hydraulic conductivity can be high. The first zone FZ can be defined by a pre-selected low temperature zone threshold that sets a maximum temperature for the first zone. The first zone temperature range can be between this pre-selected maximum temperature for the first zone to 80° C., 100° C., or some other pre-selected minimum temperature for the system. The second zone SZ can be defined by a pre-selected high temperature threshold level that set a minimum temperature for the high temperature zone. The pre-selected high temperature zone can be a temperature that ranges from the pre-selected high temperature lower limit (e.g. minimum) to a maximum magnitude.

In a third zone TZ between the first and second zones (which can also be referred to as a transition zone), the temperature can be defined as being between the pre-selected maximum temperature for the first zone (e.g. a pre-selected maximum temperature for the low temperature zone or cold zone) and the pre-selected minimum temperature for the second zone (e.g. the minimum temperature for the high temperature zone, or hot zone). In the pre-defined third zone, the fracture hydraulic conductivity can significantly change with temperature (e.g. significantly increase with an increase in temperature or significantly decrease as the temperature decreases as shown in FIG. 3, for example).

In operation of an apparatus or practice of an embodiment of my process, the working fluid flow is typically set so the flow is continuous. The flow of working fluid in the low temperature zone can therefore be a continuous flow. Often, a continuous flow can be helpful at keeping the whole geothermal system updated with the temperature of the flowing working fluid (e.g. water).

Figure 4:
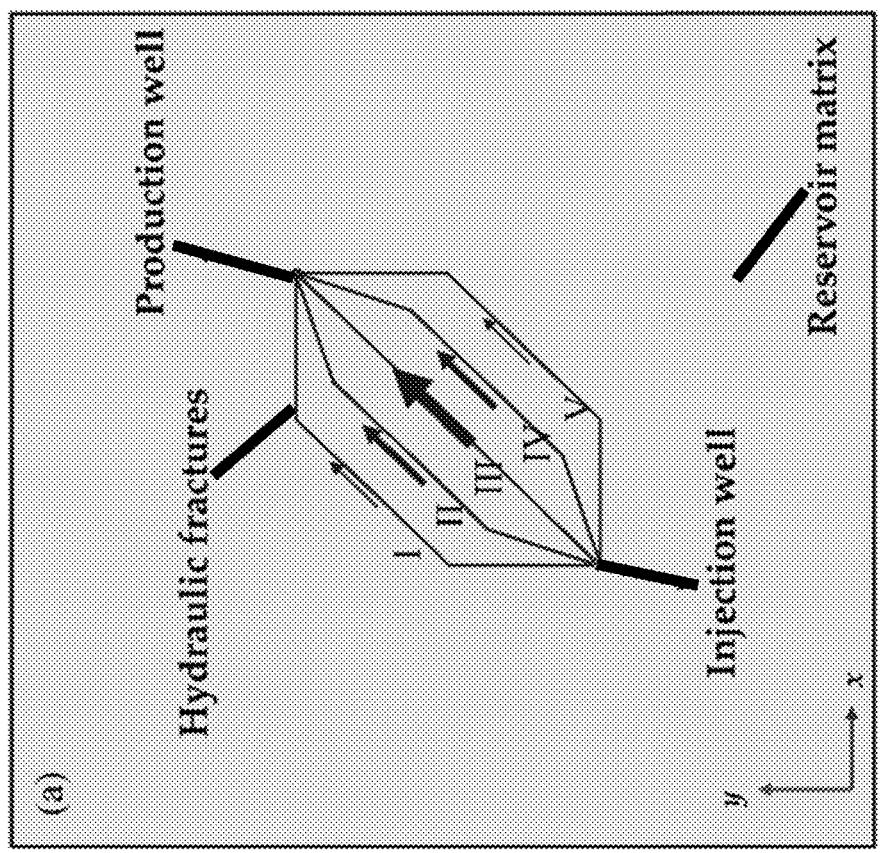
FIG. 4 is a schematic illustration of flow rates in each flow path between the injection and product well when no fracture conductivity tuning is utilized. The larger arrow for fracture III indicates a majority of fluid flows through that particular flow path. The larger arrows for fractures II and IV also indicate that more working fluid passes through those fractures than fractures I and V while that fluid is passed through fractures II and IV is also at a lower flow rate than the working fluid passed through fracture III.

In an exemplary set of fractures schematically shown in FIG. 4, there can be several fractures connecting the injector well to the producer well. When no tunable fracture hydraulic conductivity is provided, I have determined that the flow rate in fracture III will be much larger than that in other fractures, since it has the shortest path (higher pressure gradient) and might be a higher fracture hydraulic conductivity. This is illustrated in FIG. 4 by the flow arrow for fracture III being larger than the other flow arrows. As can be seen in FIG. 4, a dominant flow path would appear in this situation and more heat would be extracted from reservoir rocks around fracture III as compared to the other fractures I, II, IV and V.

Early thermal breakthrough tends to take place under the type of condition illustrated in FIG. 4 since cold water that can be used as the working fluid fed via the injector well could be fast delivered from the injector well to the producing well through fracture III without enough residence time to heat it up.

Figure 5:
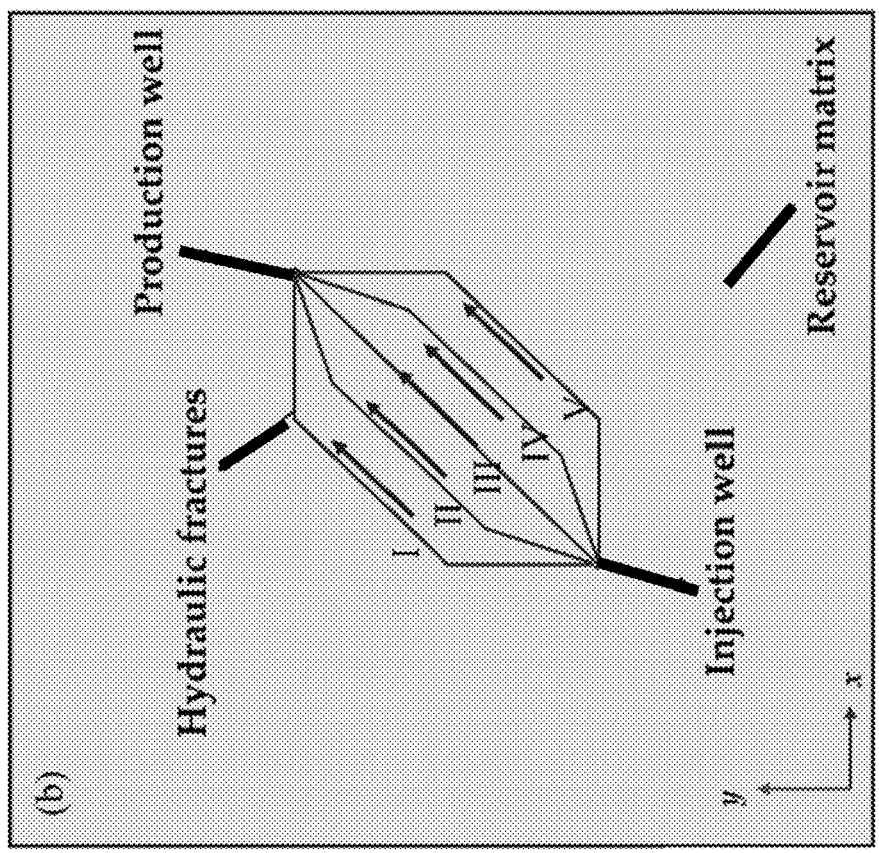
FIG. 5 is schematic illustration of flow rates in each flow path between the injection and product well when an embodiment of my fracture conductivity tuning process is utilized.

FIG. 5 illustrates an exemplary flow of working fluid that can be provided by an embodiment of my apparatus for fracture conductivity tuning, which can utilize an embodiment of my process for fracture conductivity tuning As can be seen from a comparison of FIGS. 4 and 5, in the embodiment of FIG. 5, the flow rate in fracture III would significantly decline as compared to the embodiment of FIG. 4 during the production as the flow of a working fluid (e.g. cold water) in this fracture could significantly decrease the corresponding hydraulic conductivity. Then, more working fluid flows through other fractures (e.g. fractures I, II, IV and V in the exemplary embodiment shown in FIG. 5). By configuring the apparatus for fracture conductivity tuning so that the flow rate in each fluid flow path for the fractures can be adjusted so the working fluid passed through the fractures can have the same residence time (or substantially the same residence time, e.g. within 5-20% of the same residence time, etc.) in the reservoir. In such situations as can be provided by the exemplary embodiment shown in FIG. 5, thermal breakthrough can be effectively delayed and the existing heat in the areas near fractures I and V can also be effectively tapped.

Embodiments of my apparatus can utilize a process for fracture conductivity tuning to provide pre-defined uniform working fluid flow paths through fractures (e.g. through fractures between an injection well and a production well) in different ways. For instance, a thermally sensitive coating can be provided on proppants (e.g. resin coated proppants that are thermally sensitive). These proppants can be configured to deform with temperature to adjust fracture conductivity with the surrounding temperature.

Figures 6, 7:
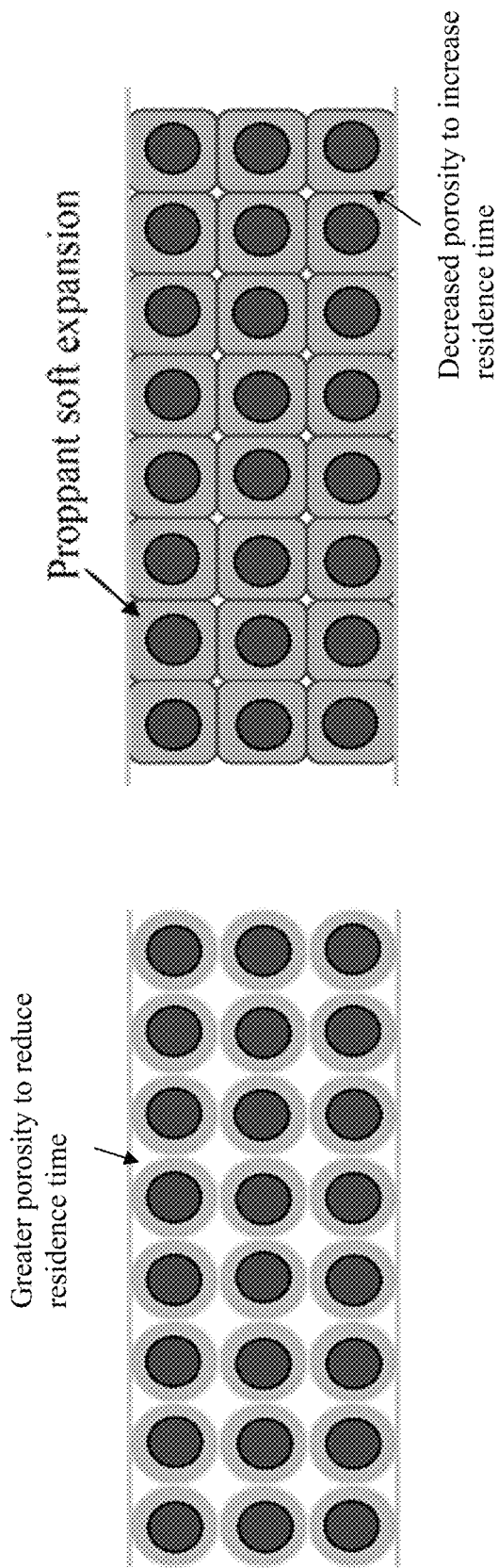
FIG. 6 is a schematic illustration of an exemplary proppant system that can be positioned in a fracture for providing tunable fracture conductivity with the proppants shown in a first state that is illustrated as a non-thermally expanded state.
FIG. 7 is a schematic illustration of the exemplary proppant system shown in FIG. 6 with the proppants shown in a second state, which is illustrated as a thermally expanded state.

When the temperature is high, these proppants would remain at their regular size in granular shape as shown in FIG. 6. By contrast, when the environment temperature decreases, the coating of proppants would expand significantly. This soft expansion may occlude the propped fracture and diminishes its hydraulic conductivity as shown in FIG. 7, for example.

Embodiments of the proppant system that can be used in embodiments of my apparatus and process for fracture conductivity tuning can be positioned inside the fractures by utilizing stimulation treatments similar to shale gas hydraulic fracturing technique. However, this proppant system can be provided to slow high hydraulic conductivity only at high enough temperatures (e.g. temperatures within the pre-selected second zone SZ).

It is contemplated that temperature adaptive conductivity can be achieved easier through circulating materials with temperature sensitive solubility. Such materials can be adjustable clogging material (ACM) having a temperature sensitive solubility so that a substantial portion of the material (e.g. 80%-100% of the ACM within the working fluid) is able to be liquified (e.g. solubilize) when at a high temperature (e.g. a temperature of the second zone SZ) but precipitate out of the working fluid as a solid and form a solid when at a lower temperature (e.g. a temperature of the third zone TZ or first zone FZ). For instance, the calcium carbonate family can have lower solubility in lower temperatures that can allow them to form a lining along cold fractures (e.g. fracture locations within the first zone, FZ) while these linings will not form along a hot stream path. Proppants that can provide the type of thermal volume expansion shown in FIGS. 6-7 can be comprised of calcium carbonate material or other material that may expand at lower temperatures and decrease in volume (e.g. shrink) back to a regular size at hotter temperatures (e.g. a temperature within the second temperature zone SZ).

FIGS. 35 and 36 illustrate another option that can be used in conjunction with the above discussed temperature sensitive proppants or used as an alternative to such proppants. Temperature adaptive conductivity can also be achieved by adding materials with temperature-sensitive solubility into the circulation fluids. These materials can be referred to as adjustable clogging material (ACM). ACM can have a temperature sensitive solubility such that the ACM is in a solution state (e.g. dissolved in a liquid) when at or above a first temperature and in a solid state at or below a second temperature when included within a working fluid (e.g. water) passing through a fracture or fracture system.

At high temperatures, ACM can be included solubilized in water (e.g. dissolved in water to form an aqueous mixture) or other working fluid in larger amounts and maintain high hydraulic conductivity. While at low temperatures, the ACM can precipitate out of the liquid working fluid to form solids that can impede the fluid flow though the pore spaces 35A of the fracture system. For instance, materials like calcium chloride, potassium chloride, and magnesium chloride have lower solubility in water at low temperatures. Additionally, hydration of these materials at high temperatures increases their solubility significantly. A schematic of the function of these ACM is shown in FIGS. 35 and 36 to illustrate the non-precipitation and precipitation that can occur and how that temperature dependent precipitation can help adjust hydraulic conductivity of the working fluid passing through different parts of a fracture system. This temperature-sensitive precipitation/solubility of the ACM within the working fluid can enable the ACM to precipitate along cold parts 36A of the fracture(s) and thus decrease hydraulic conductivity in these areas (e.g. as illustrated in FIG. 36). In contrast, these precipitation linings will not develop along hot stream paths (e.g. as shown in FIG. 35). The pores 35A can be larger due to the solubility of the ACM when the surrounding temperature of the fracture system is at or above a pre-selected temperature to reduce the resident time of fluid passing through the hotter fractures whereas the cold parts 36A of the fractures can have precipitate linings formed therein when the surrounding temperature is at or below a pre-selected solubility temperature to decrease hydraulic conductivity and increase the resident time of fluid passing through the colder fractures.

In some configurations, at lower temperatures (e.g. a temperature below a first temperature), more linings may not be added but the existing lining that may be formed via the ACM can become thicker to reduce the conductivity. As the temperature warms, the lining may then become thinner and/or dissolve (e.g. when temperature is at or above the second temperature) to increase the conductivity.

The adjustment in hydraulic conductivity that can be provided by the ACM can help provide a more uniform or a substantially uniform heat extraction so that a flow rate through the different fractures can change to account for the surrounding temperatures of the fractures.

Embodiments of the fracture conductivity tuning technique can provide several advantages that make it attractive for field application. First of all, embodiments can be adaptive and reversible. For instance, proppants can recover their original shape as the cooled spots of the reservoir warm up again. When the spots cool down again to a pre-selected temperature, the material can again expand to clog or block pores to again reduce hydraulic conductivity in the cooled region of a reservoir so fluid passes through other fractures of the reservoir that are at a higher temperature to provide an improved and more uniform extraction of heat from all the fractures of the reservoir. This same scenario can repeatedly occur for various different fractures of a reservoir based on the substance solubility of the ACM.

As a second exemplary advantage, early thermal breakthrough can be delayed using an embodiment of my process and/or apparatus as it can provide a uniform temperature gradient between wells which can provide similar resident time for different streamlines rather than providing shortcuts through high conductivity fractures. By adjusting fracture conductivity, a uniform heat flow can be obtained in the system which make it possible to extract heat from larger areas of the reservoir rather than concentrating heat extraction to the single line or fracture having the highest conductivity that connects injector and producer wells.

Furthermore, heterogeneity in rock properties is something that cannot be avoided in geological systems. It is common to have sweet spots with high or low permeability or zones with different thermal conductivities. Such heterogeneities may alter heat redistribution and reduce the effectiveness of a geothermal system. An embodiment of my process or apparatus that can affect fracture conductivity based on the spot temperature can suppress the negative impacts of these heterogeneities.

As yet another exemplary advantage, the cost of using an embodiment of my process or apparatus can be very low relative to the benefits that can be provided. For instance, special temperature-sensitive proppants can be pumped in a combination with regular proppants to reduce costs but still maintain selective hydraulic conductivity.

Embodiments can be utilized as a substitute for or in conjunction with divertor agents that may be utilized inside a fracture or placing a thermally-sensitive gate inside a producer well. For instance, embodiments can be provided to control the flow of the working fluid far away from the injector and producer wells inside the reservoir. However, embodiments may also (or alternatively) also provide conductivity tunability inside wells too.

To study the feasibility of an embodiment of my apparatus for fracture conductivity tuning in an EGS, I created a mathematical model for the problem, established a numerical model, and validated the developed model with analytical solutions. The results and discussions are presented herein.

Several factors are particularly evaluated from this evaluation of an embodiment of my process and apparatus for fracture conductivity tuning. These factors include the evaluation of the feasibility of an embodiment for the optimization of EGS, potential application in only a single well, and the potential for using this technique only over a segment of fractures. The conducted evaluation that was performed also evaluated the impact of controlling the flow deep inside the reservoir.

Mathematical Modeling

To simulate the heat extraction process in an EGS, I made several assumptions. In this study, water is used as working fluid in the heat extraction process. Working fluid is assumed to be incompressible and rock is assumed slightly compressible. Then, fluid flow is simplified into single-phase flow in a solution state (e.g. dissolved in the fluid) with no steam generation. The permeability of the reservoir matrix is homogeneous and isotropic. Heat transfer between fluid and solid rock consists of heat conduction and heat convection.

Following these assumptions, a detailed mathematical model can be presented as follows.

By assuming the reservoir matrix has been fully saturated, then fluid flow in the reservoir matrix can be descried by Darcy's law. Corresponding kinematic equation for the fluid flow can be written as:

$$u = -\frac{k_m}{\mu_f}(\nabla p - \rho_f g \nabla z), \quad (1)$$

where u is the vector of Darcy's seepage velocity in the reservoir matrix. $k_m$ represents the permeability of the reservoir matrix. $\mu_f$ and $\rho_f$ are the viscosity and density of the working fluid, respectively. p is the pore pressure. $\nabla \rho$ represents the Hamiltonian operator which calculates the gradient of a scalar. G represents the gravitational acceleration in vertical direction and $\rho_f g \nabla z$ represents the whole gravity terms. The continuity equation for the fluid flow in the reservoir can be expressed as:

$$\frac{\partial(\phi_m \rho_f)}{\partial t} + \nabla \cdot (\rho_f u) = 0, \quad (2)$$

where $\phi_m$ denotes the porosity of reservoir matrix. Assuming the reservoir rock is slightly compressible, the state equation for the porosity of the reservoir matrix is $$c_m = \frac{1}{\phi_m} \cdot \frac{d\phi_m}{dp}, \quad (3)$$

where $c_m$ is the compressibility coefficient of the reservoir rock. It is worth noting that, the compressibility coefficient of fluid is set as zero because water is used as working fluid, which is incompressible.

For the EGS, fluid flow along the fractures plays critical role in extracting heat and is different from the fluid flow in the reservoir matrix. In this study, all fractures contributing to the fluid flow are numerically represented by the discrete fracture model (DFM). Using DFM can significantly decrease difficulties regarding mesh generation and meanwhile enhances the computational efficiency.

For fluid flow in discrete fractures, kinematic equation can be expressed as following:

$$u_f = -\frac{k_f}{\mu_f}(\nabla_T p + \rho_f g \nabla_T z), \quad (4)$$

where $u_f$ is the vector of fluid velocity in discrete fractures. $\nabla_T p_f$ is the pressure gradient tangent to the fracture surface. $k_f$ represents the permeability of fracture.

The state equation for the porosity inside the fracture is presumed to follow linear compressibility:

$$c_{fr} = \frac{1}{\phi_f} \cdot \frac{d\phi_f}{dp_f}, \quad (5)$$

where $\phi_f$ is the porosity of the fracture. $c_{fr}$ is the compressibility coefficient of the porosity of the fracture.

The continuity equation for the fluid flow along hydraulic fractures is as:

$$\nabla_T \cdot (d_f \rho_f u_f) + d_f \frac{\partial}{\partial t}(\phi_f \rho_f) = 0, \quad (6)$$

where $d_f$ denotes the fracture aperture. The outer boundary of the reservoir $\partial p$ is assumed to be a closed boundary:

$$-n \cdot \rho_f u|_{\partial \Omega_1} = 0. \quad (7)$$

The inner boundary of the reservoir $\partial \Omega$ is assigned with a constant bottomhole pressure i.e.

$$p|_{\partial \Omega_2} = p_w, \quad (8)$$

where $p_w$ is the bottomhole pressure. The initial condition for the reservoir is as following:

$$p|_{t=0} = p_i, \quad (9)$$

where $p_i$ is the initial reservoir pressure.

Heat transfer in the EGS consists of heat conduction and heat convection. During production, convection plays a dominant role in heat extraction. Assuming the local equilibrium is achieved in the porous media, which means the temperature for the fluid at the rock surface equals to the temperature of rock, then the temperature distribution in the reservoir matrix can be calculated as:

$$(\rho c)_{eff} \frac{\partial T}{\partial t} + \rho_f c_f u \cdot \nabla T - \nabla \cdot (\lambda_{eff} \nabla T) = 0, \quad (10)$$

where T is the temperature, $c_f$ is the heat capacity of working fluid, and $\lambda_{eff}$ is the effective heat conductivity. Assuming heat conduction in solid and fluid phases happen simultaneously, then the effective heat conductivity is the weighted arithmetic of the heat conductivity of solid phase $\lambda_s$ and fluid phase $\rho_f$ as following:

$$\lambda_{eff} = \phi_m \lambda_f + (1-\phi_m)\lambda_s. \quad (11)$$

In Eq. (10), $(\rho c)_{eff}$ is the effective heat capacity per unit volume which is also a weighted arithmetic:

$$(\rho c)_{eff} = \phi_m \rho_f c_f + (1-\phi_m)\rho_s c_s, \quad (12)$$

where $c_s$ is the heat capacity of the solid phase. $\rho_s$ is the density of the solid phase.

Similar to Eq. (10), heat transfer in discrete fractures can be expressed as:

$$d_f(\rho c)_{eff} \frac{\partial T}{\partial t} + d_f \rho_f c_f u \cdot \nabla_T T - \nabla_T \cdot (d_f \lambda_{eff} \nabla_T T) = 0. \quad (13)$$

The outer boundary of the reservoir model is assumed to have no heat flux i.e.

$$-n \cdot (\lambda_{eff} \nabla_T T)|_{\partial \Omega_1} = 0. \quad (14)$$

For the injection well, temperature of working fluid is set as a constant as following:

$$T|_{\partial \Omega_2} = T_{inj}, \quad (15)$$

where $T_{inj}$ is the temperature of injected fluid. The initial condition of temperature distribution is as following:

$$T|_{t=0} = T_i, \quad (16)$$

where $T_i$ is the initial reservoir temperature.

Simulation Examples

Figure 8:
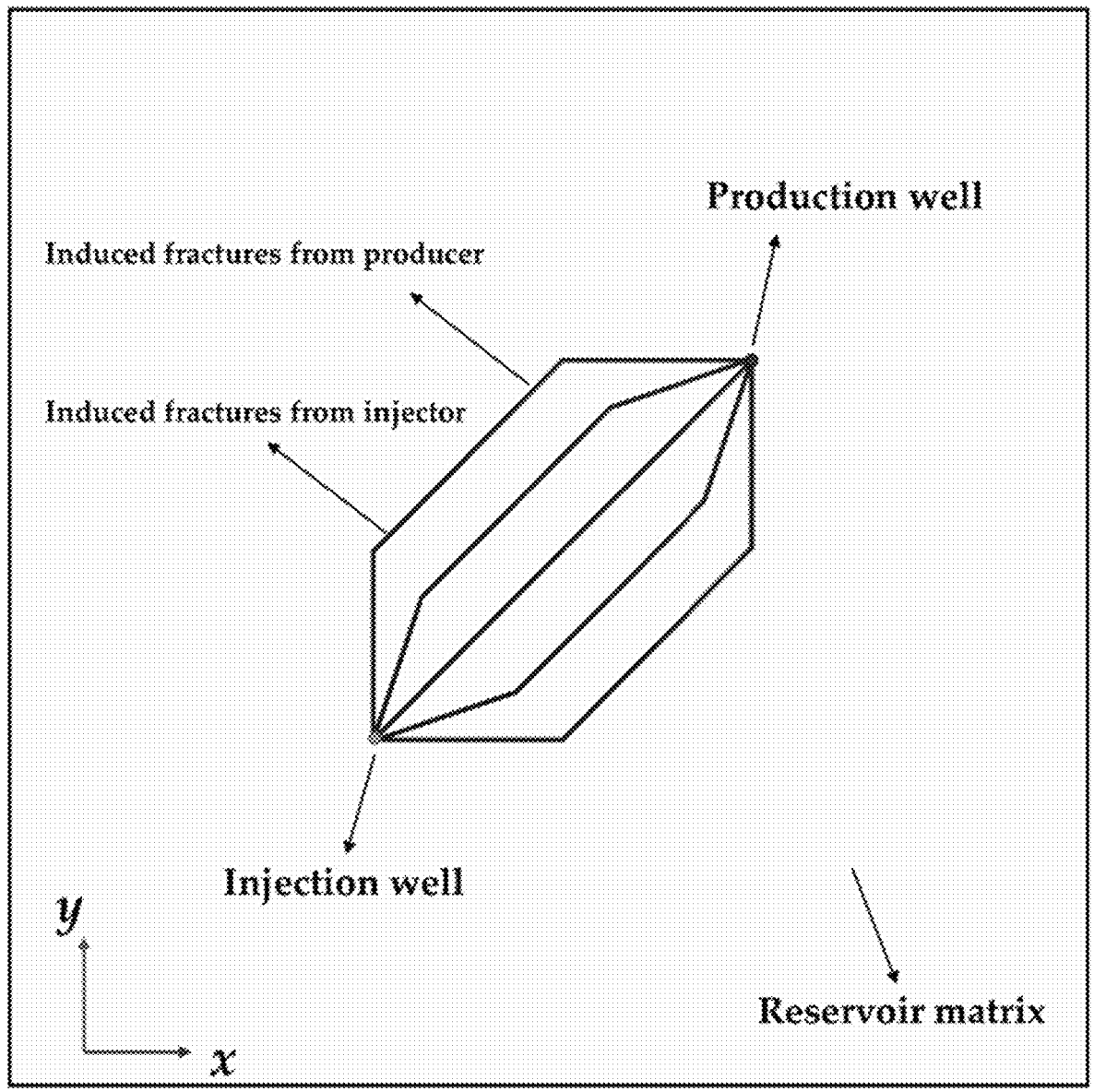
FIG. 8 is a two-dimensional representation of the diagram of the geometry for a simulation model illustrated in a 2-D map view.

Based on the above discussed mathematical modeling, a three-dimensional numerical model for the simulation of an embodiment of my apparatus that may use an embodiment of my process was created. The model geometry in the map view is shown in FIG. 8. In this geometry, a vertical injection well and a vertical production well are placed in a reservoir and connected through several induced fractures, i.e., flow paths with high conductivity. Since well spacing in this model is not too large, i.e., 300 m, I assumed that fractures initiated from each well can connect to those fractures created by pumping pressurized fluids from the other well for this simulation work.

Figure 9:
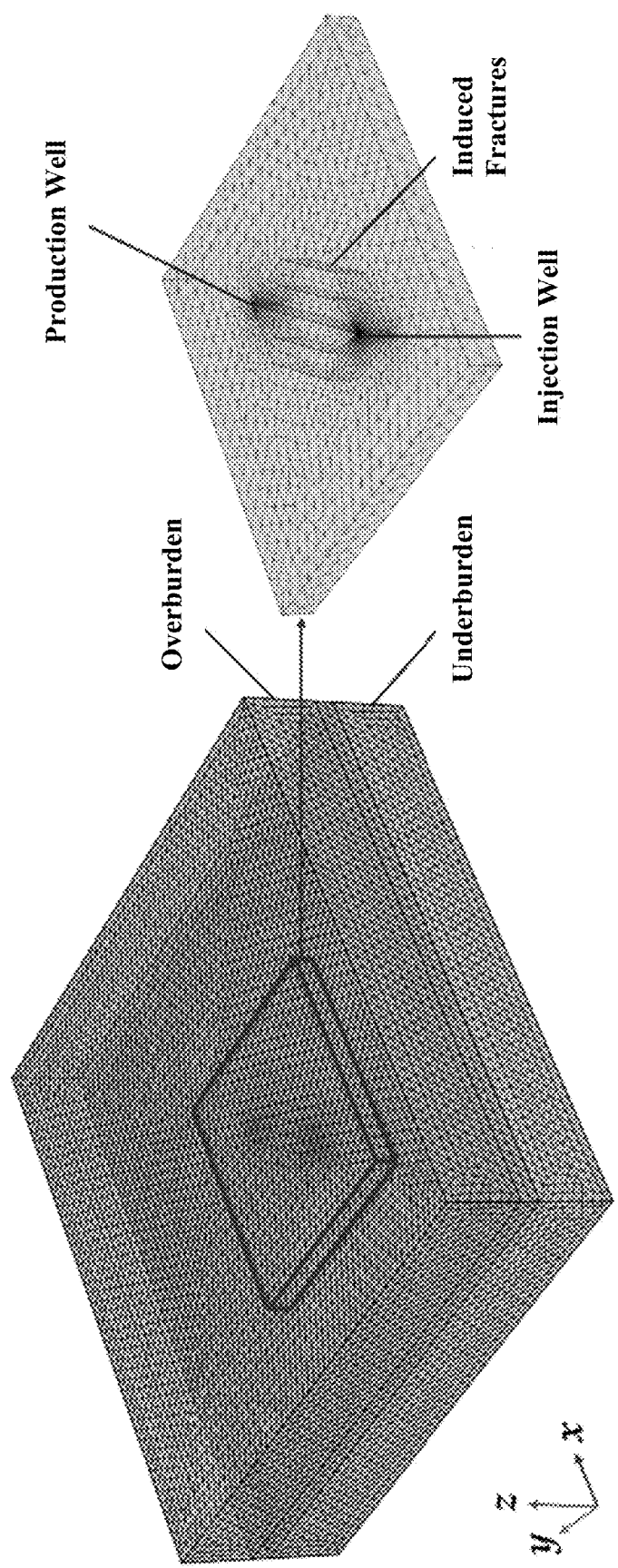
FIG. 9 is a mesh diagram for the geothermal reservoir with two vertical wells used in simulation work discussed herein. The x, y, and z axes are provided in this FIG. 9 for the horizontal, depth, and vertical directions used in FIG. 9. An enlargement of the central region of the diagram is also provided in FIG. 9 as indicated therein.

In this model, unstructured tetrahedron elements were utilized for the mesh generation. The mesh diagram is shown in FIG. 9. The area inside the box is enlarged in FIG. 9 and represents the meshed version of the model in FIG. 8. To consider heat transfer between layers and prevent potential effects of the model boundaries, the size of the whole model was enlarged and an overburden and an underburden were added to resemble a real situation in the field. The parameters used for the simulation of the EGS and fracture conductivity are listed in Table 1.

TABLE 1

Parameters for the numerical model.

| Parameter | Value | Unit |
| --- | --- | --- |
| Dimensions of the reservoir | 1500 × 1500 × 450 | m$^3$ |
| Permeability of the reservoir | 1 | 10$^{-3}$ μm$^2$ |
| Permeability of overburden and underburden layers | 0.05 | 10$^{-3}$ μm$^2$ |
| Initial porosity of reservoir | 10 | % |
| Density of the reservoir rock | 2700 | kg/m$^3$ |
| Thermal conductivity of the formation matrix | 2.8 | W/(m · K) |
| Specific heat capacity of the formation matrix | 1000 | J/(kg · K) |
| Compressibility of the reservoir rock | 2.5 × 10$^{-9}$ | 1/Pa |
| Initial porosity of fractures | 20 | % |
| Thermal conductivity of propped fractures | 2.8 | W/(m · K) |
| Specific heat capacity of propped fractures | 850 | J/(kg · K) |
| Water viscosity | 1 × 10$^{-3}$ | Pa · s |
| Water density | 1000 | kg/m$^3$ |
| Water specific heat capacity | 4200 | J/(kg · K) |
| Initial reservoir pressure | 3.0 × 10$^7$ | Pa |
| Initial reservoir temperature | 353.15 | K |
| Production pressure | 1.5 × 10$^7$ | Pa |
| Injection pressure | 4.5 × 10$^7$ | Pa |
| Injection temperature | 313.15 | K |
| Simulation period | 50 | Year |

Before running detailed numerical analysis, the parameters for the numerical solver was tuned and calibrated to ensure the model convergence, stability, and high computational accuracy. The simulation model is discretized based on the finite element method (FEM). Detailed parameter settings for the solver are listed in Table 2.

TABLE 2

Parameters for the numerical solver

| Parameter | Value | Unit |
| --- | --- | --- |
| Time-dependent solver | MUMPS | |
| Time stepping method | Backward Differentiation Formulas (BDF) | |
| Maximum BDF order | 2 | |
| Minimum BDF order | 1 | |
| Event tolerance | 0.01 | |
| Consistence initialization | Backward Euler | |
| Fraction of initial step for Backward Euler | 0.001 | |
| Initial time step length | 0.001 | day |
| Maximum time step length | 100 | day |

As mentioned before, the temperature adaptive fracture conductivity can help maintain high temperature of produced fluid after long-term production and thus enhance heat extraction efficiency. However, the overall economic efficiency of the whole system can depend on the production rate and the temperature of produced fluid, which heavily relies on operational conditions:

When the production well(s) operates at a constant rate, the only factor that may affect the economic efficiency is the temperature of the produced fluid. As a result, there is no doubt that the utilization of an embodiment of my process and apparatus can raise the projected profit due to the increased heat extraction.

When the production well(s) operates with a constant pressure, the economic efficiency can be affected by at least two significant factors, which are produced fluid temperature and the production rate. Utilizing an embodiment of my process and/or apparatus can enhance the temperature of the produced fluid but can also damage the well productivity as overall fracture hydraulic conductivity decreases.

It can be assumed that the fracture hydraulic conductivity in the high-temperature zone $F_{RCD, max}$ (e.g. second zone SD) remains constant, which is assumed to 1 D·cm in another conducted study that was performed to evaluate the potential performance of an embodiment of my process for fracture conductivity tuning.

The fracture conductivity in the low-temperature zone $F_{RCD, min}$ (e.g. first zone FZ) can be designed by mixing regular proppants with special proppants, changing the concentration of the soluble agent, or changing the proppant coating thickness. It is assumed that the value of minimum conductivity $F_{RCD, nm}$ is related to $F_{RCD, max}$ as described as following:

$$F_{RCD,min} = a \times F_{RCD,max}, \quad (17)$$

where a is the coefficient of the ultimate hydraulic conductivity reduction. For scenarios 1, 2, 3 and 4 in this section, the coefficients of ultimate conductivity reduction a would be equal to 0.25, 0.5, 0.75 and 1.0, respectively. It is worth noting that when the coefficient a equals to one, the hydraulic conductivity will not change with the temperature. In other words, the process was not implemented in the simulation when a=1.

Figure 10:
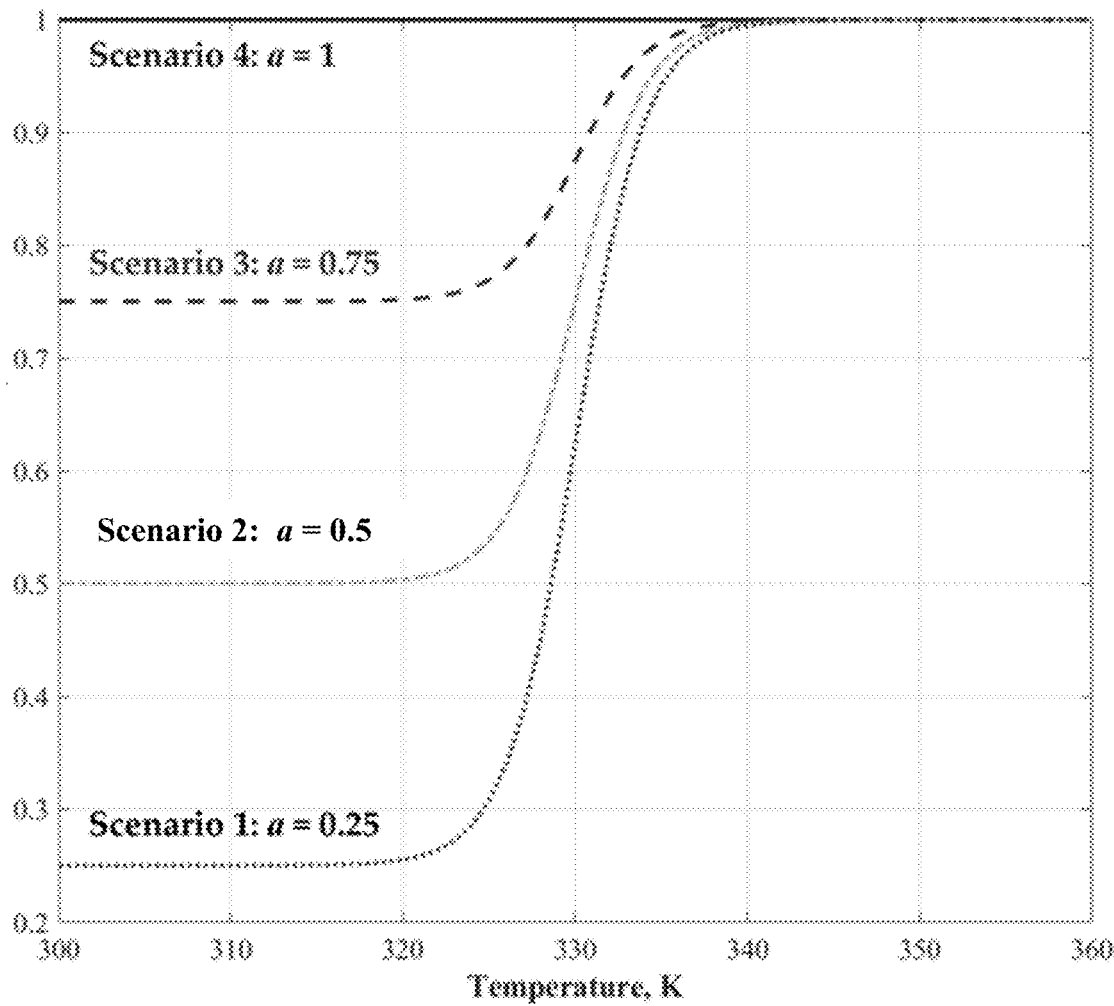
FIG. 10 illustrates a graph of simulation results for simulation work that was conducted as discussed herein.

How the fracture hydraulic conductivity may change versus temperature for different simulation scenarios are shown in FIG. 10.

Figure 11:
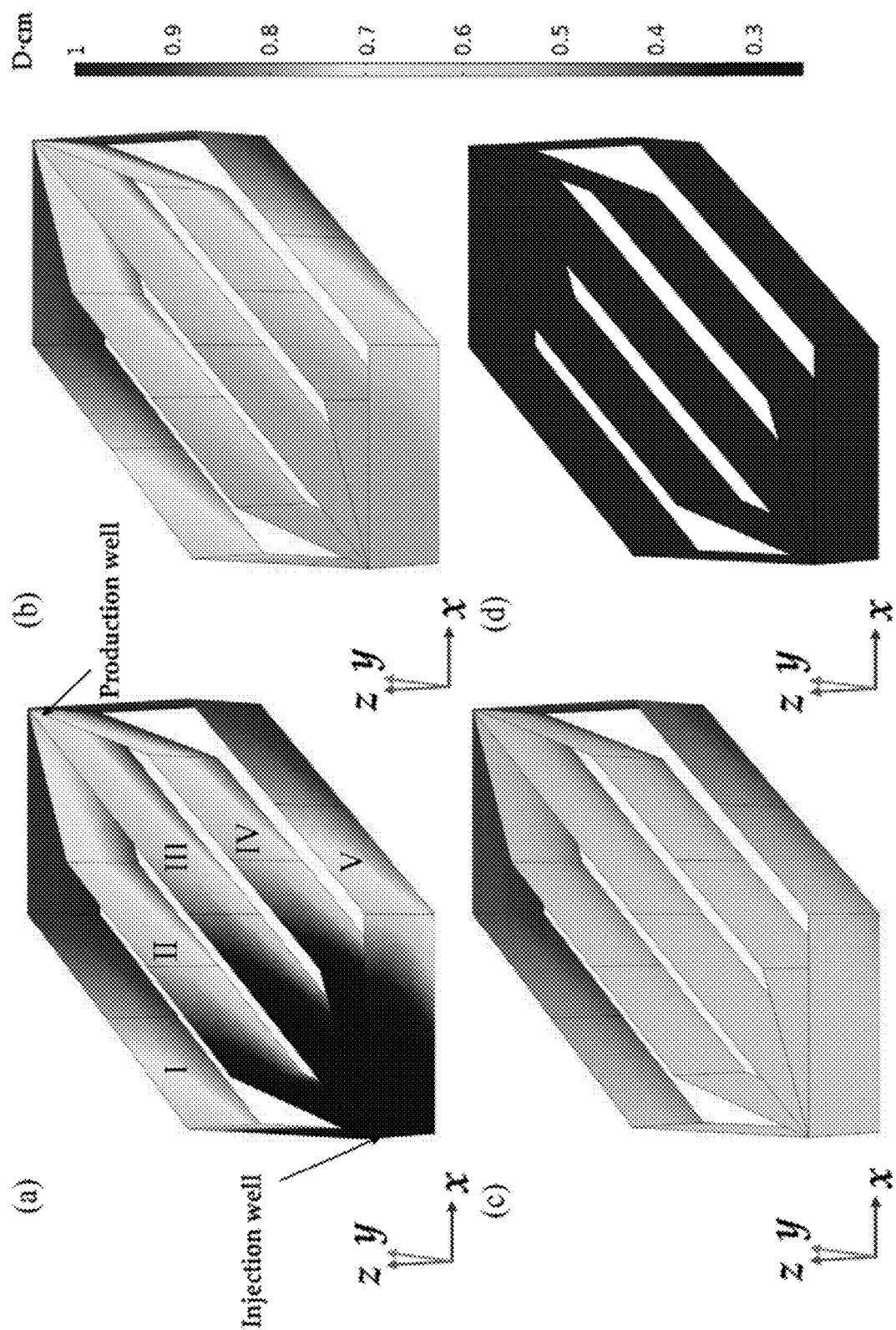
FIG. 11 illustrates a series of graphs (a), (b), (c), and (d) having their x, y, and z axes defined for each graph adjacent a fracture conductivity key to provide a comparison of how simulation results were obtained for different simulated scenarios. The simulation scenarios included (a) a=0.25; (b) a=0.5; (c) a=0.75; and (d) a=1.
Figure 12:
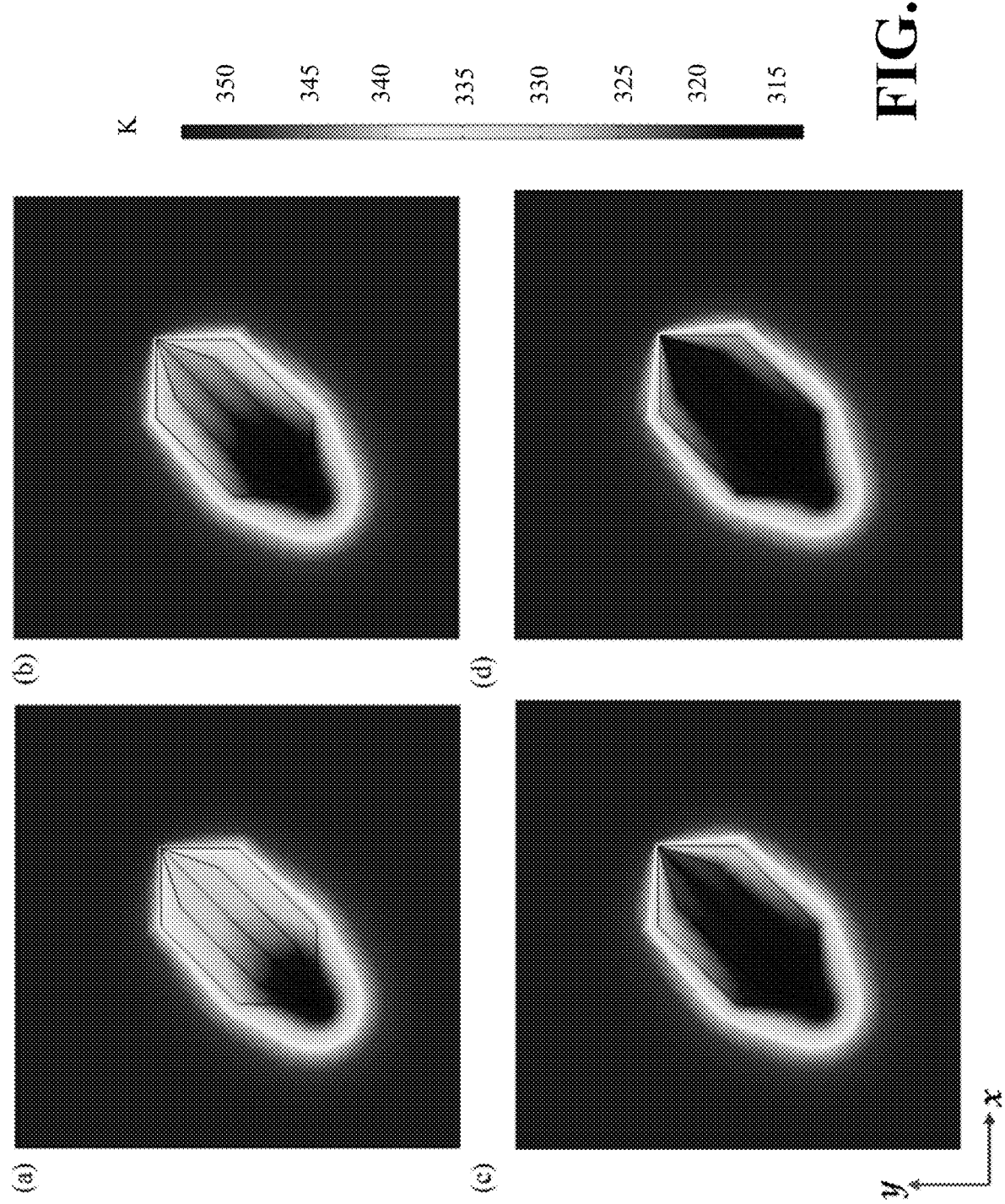
FIG. 12 is a series of temperature distribution graphs illustrating simulation results for a reservoir after 50 years of production according to scenarios (a), (b), (c), and (d), where (a) a=0.25; (b) a=0.5; (c) a=0.75; (d) a=1. A temperature scale in temperature units of Kelvin (K) is also illustrated in FIG. 12 adjacent the graphs.

FIG. 12 shows the distribution of fracture hydraulic conductivity after a continuous production of 50 years for different simulation scenarios (a) through (d), where in (a) a=0.25; (b) a=0.5; (c) a=0.75; (d) a=1. From the FIG. 11, it can be easily identified that, as long as a≠1, i.e., the presented fracture conductivity tuning technique is adopted, the overall conductivity in fractures I and V is much higher than the conductivity in fracture III. Therefore, more working fluid could circulate through fractures I and V during production, which enables operators to extract more heat in the area near these fractures.

FIG. 12 shows the corresponding temperature distribution after 50 years of production according to different simulation scenarios (a)-(d) discussed above. It can be seen from FIG. 12 that, after 50 years of production, all these scenarios have reached thermal breakthrough. However, dominant flow paths in scenario 4 can be easily identified in the case in which an embodiment of my process for fracture tuning was not utilized. In this condition of scenario (d), working fluid would fast circulate from the injector to the producer without enough heating, which had a negative impact on the geothermal system's output. By contrast, in scenario (a), all the fractures contribute evenly to the fluid circulation, and it cannot recognize any dominant flow path or "short-circuit" flow path in the reservoir, which could effectively enhance the production efficiency of the geothermal system.

Figure 13:
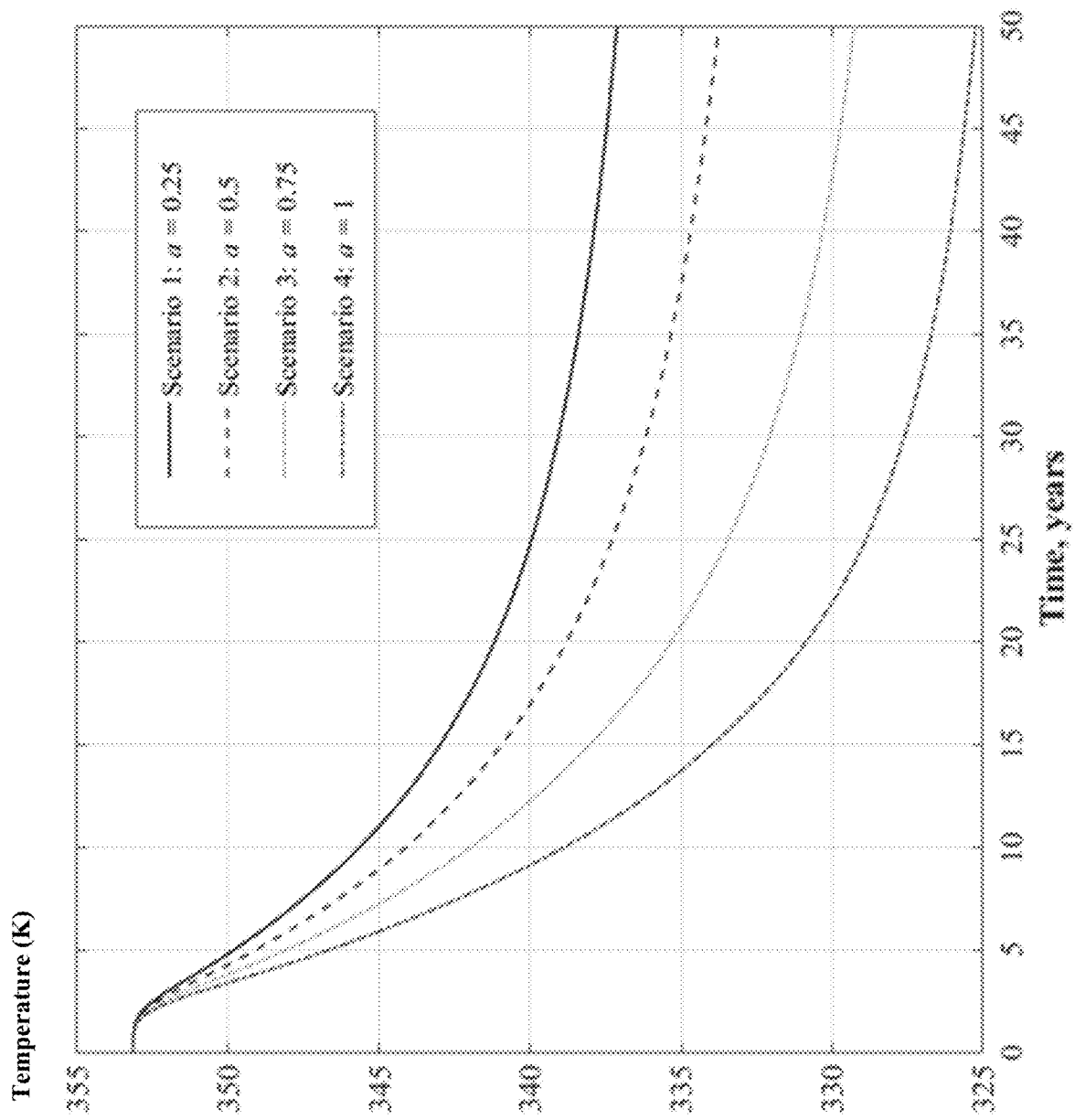
FIG. 13 is a graph illustrating simulation results for fluid temperature at the production well for different scenarios 1-4, where scenario 1 included a=0.25; scenario 2 included a=0.5; scenario 3 included a=0.75; and scenario 4 included a=1.

To quantitatively evaluate the performance of the simulated embodiment of my process an a geothermal system, a few outcomes of adopting different embodiments (or scenarios) are compared. FIG. 13 shows the evolution of the temperature of produced fluids over 50 years of operation according to different simulation scenarios. It could be seen from the comparison that, when my process was not adopted in the geothermal system (e.g. scenario 4, temperature of the produced fluid would drop rapidly over 50 years of production, from 353.15 K to 325.45 K. By contrast, when an embodiment was utilized for scenario 1 where a=0.25, the temperature of the produced fluid after 50 years of operation could reach 337.21 K, which is around 12 K higher than the temperature of the produced fluid without use of an embodiment of my process or apparatus (scenario 4). In other words, the application of an embodiment of my process can enable maintaining high production temperatures even after long-term production, which is considerable improvement for EGS.

Figure 14:
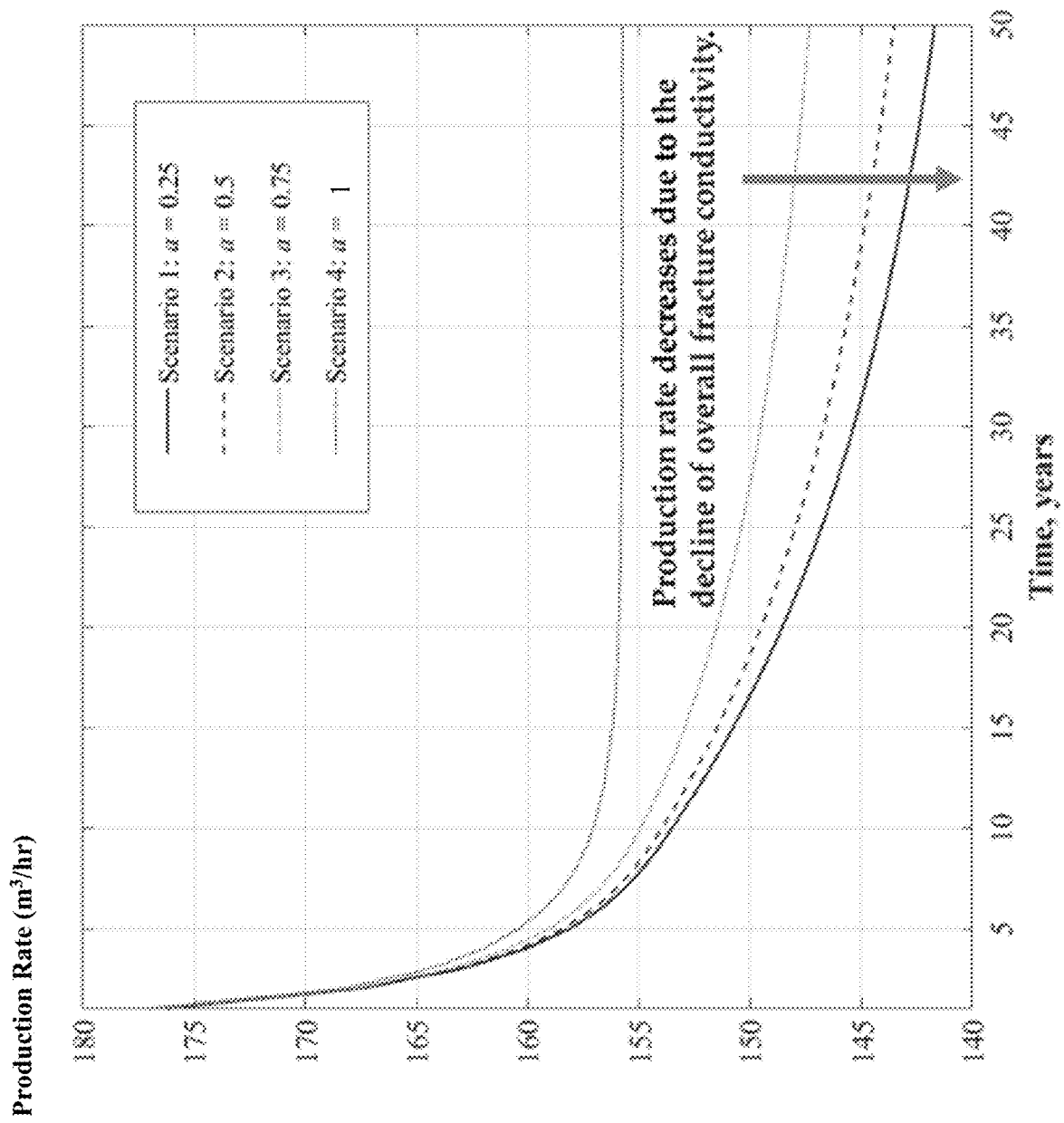
FIG. 14 is a graph illustrating simulation results for production rates at the production well for different scenarios 1-4, where scenario 1 included a=0.25; scenario 2 included a=0.5; scenario 3 included a=0.75; and scenario 4 included a=1.

Although the application of an embodiment of my process could maintain high production temperature after long-term production, it could also decrease the production rate since the overall fracture conductivity of the system may decrease. FIG. 14 shows the evolution of production rate over 50 years of production. It could be seen from the comparison that, when an embodiment of my process is not adopted in the system, i.e., scenario 4, production rate keeps decreasing at the beginning. Then, after 10 years, the production rate gradually stabilizes at 155.76 m³/hr and nearly reaches the steady state.

By contrast, when an embodiment of my process is utilized in the simulation results and a=0.25, i.e., scenario 1, the production rate keeps decreasing from the beginning to the end because the overall fracture conductivity always keeps declining as well. After 50 years of production, production rate in scenario 1 could reach 141.73 m³/hr, which is around 14 m³/hr lower than that in scenario 4 (no utilization of an embodiment of my process or apparatus).

To evaluate the overall performance of EGS, the temperature of produced fluid and production rate can be considered at the same time. The output thermal power harvested from EGS can be evaluated as follows:

$$Q_p = c_f m(T_p - T_{inj}), \quad (18)$$

where $c_f$ is the heat capacity of working fluid, m is the flow rate in kg/s, $T_p$ is the temperature of the produced fluid, and $T_{inj}$ is the injection temperature.

Figure 15:
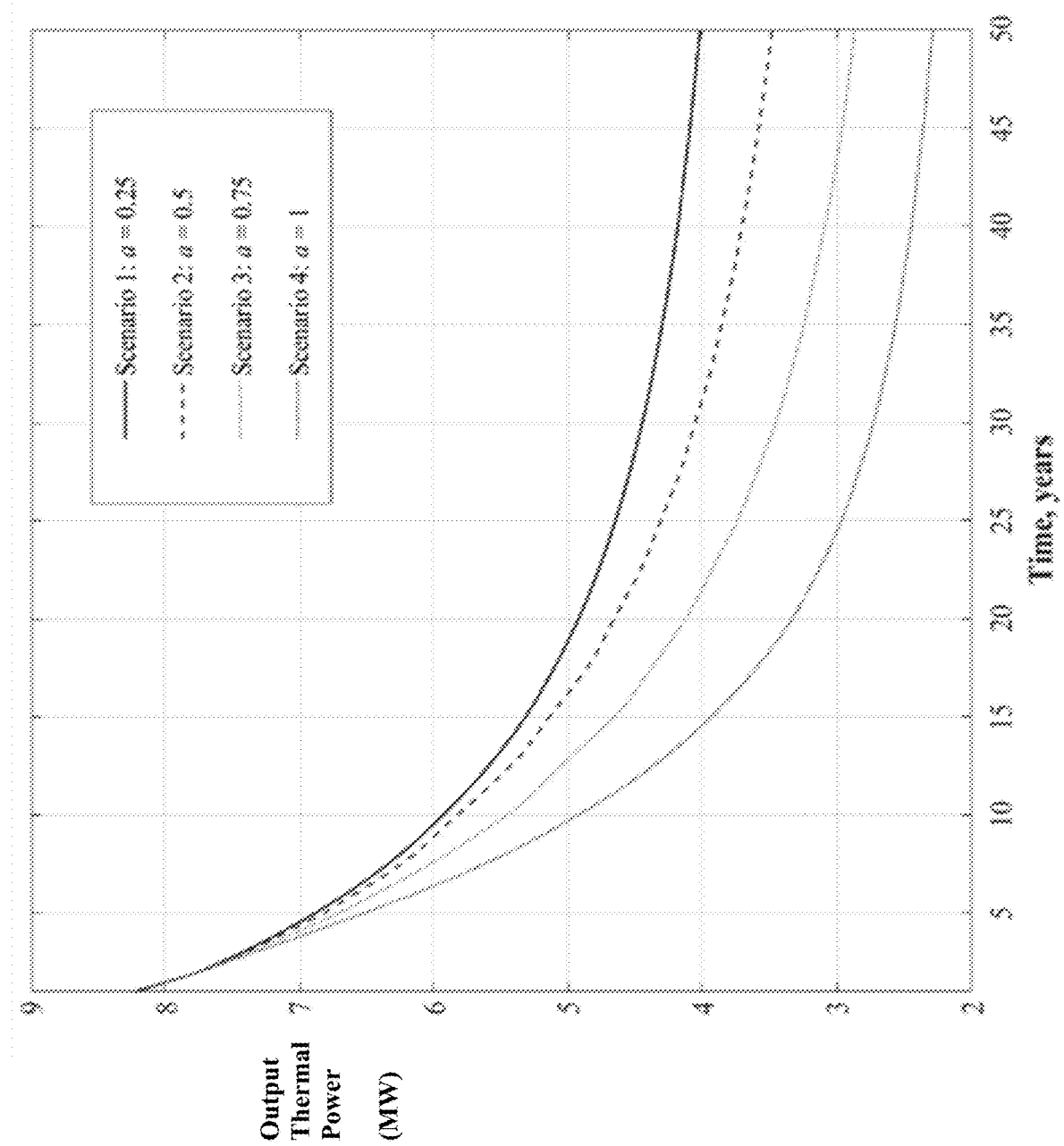
FIG. 15 is a graph illustrating simulation results for output thermal power at the production well for different scenarios 1-4, where scenario 1 included a=0.25; scenario 2 included a=0.5; scenario 3 included a=0.75; and scenario 4 included a=1.

A comparison of output thermal power over 50 years of operation is as shown in FIG. 15. It can be seen that, as the value of a increases, the output thermal power is increased as well. When a equals to 0.25, i.e., scenario 1, the output thermal power after 50 years of production could maintain at around 4 MW. By contrast, when a equals to one, i.e., scenario 4 (no use of an embodiment of my process or apparatus), the output thermal power after 50 years of production could decrease to 2.2 MW, which is 82% smaller than that in scenario 1. To sum up, the utilization of an embodiment of my process or apparatus could significantly enhance the heat extraction from the EGS in the long-term.

Figure 16:
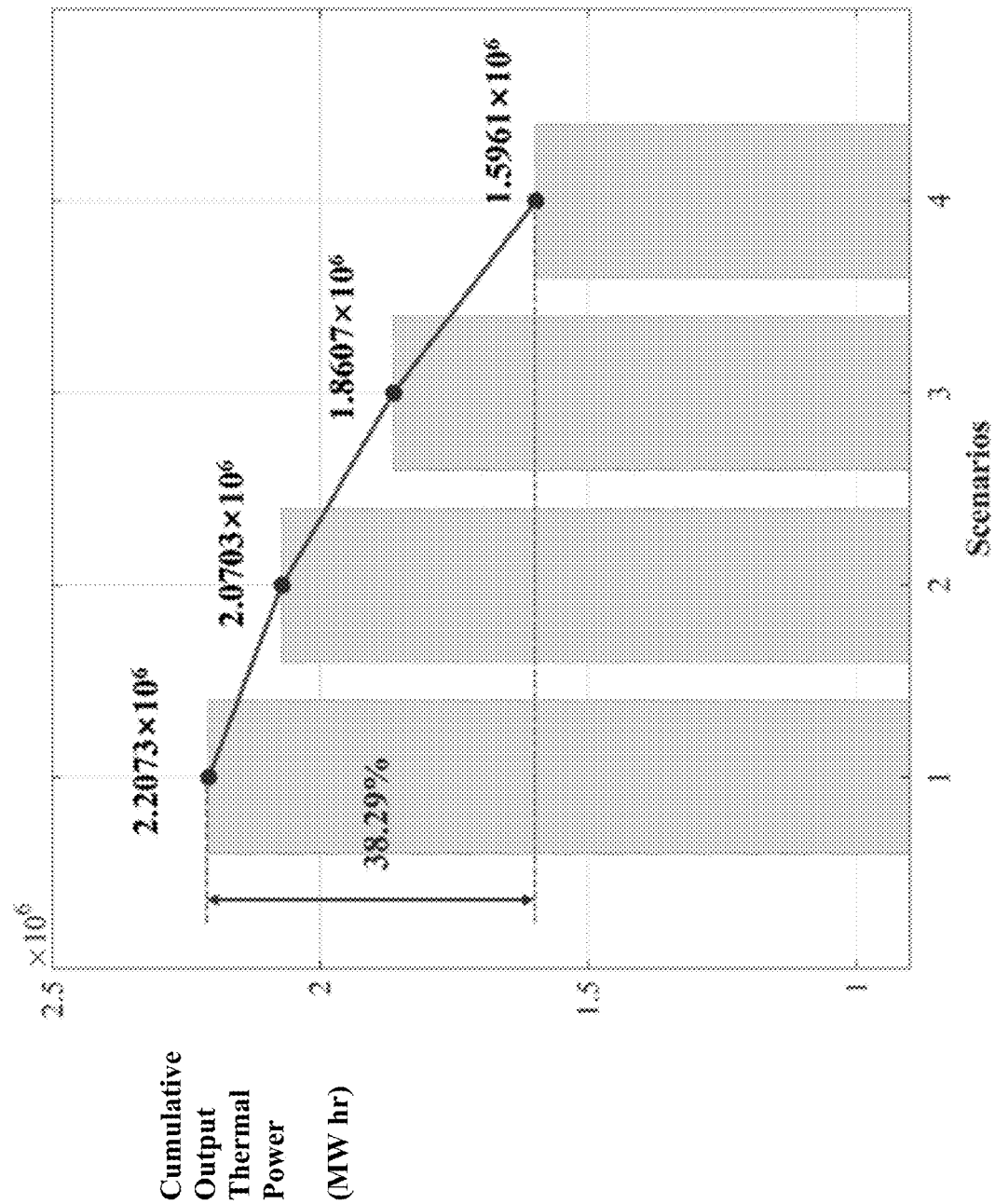
FIG. 16 is a graph illustrating simulated cumulative output power after 50 years of production for different scenarios where scenario 1 included a=0.25; scenario 2 included a=0.5; scenario 3 included a=0.75; and scenario 4 included a=1.

FIG. 16 shows the comparison of cumulative output thermal power after 50 years of production. It could be seen from the figure that the utilization of an embodiment of my process or apparatus can significantly enhance the cumulative output thermal power. When an embodiment of my process or apparatus is adopted and a is 0.25, i.e., scenario 1, the cumulative output thermal power after 50 years of production could reach $2.2073 \times 10^6$ MW·hr. By contrast, when an embodiment of my process or apparatus is not adopted and a equals to one, i.e., scenario 4, the cumulative output thermal power after 50 years of production could be only $1.5961 \times 10^6$ MW·hr. In other word, the utilization of the new technology could bring an improvement of 38.29% in the heat extraction. This production improvement is significantly considerable for the economics of a geothermal system.

Simulation work was also performed to evaluate how embodiments may be utilized to improve the long-term efficiency of an EGS or other type of geothermal system. However, as mentioned before, some embodiments can utilize placement of special proppants (e.g. proppants for a proppant system or circulating materials) with temperature-sensitive solubility, which may add cost if applied to stimulations in both injector and producer wells. In practice, it might be more economic to apply such proppant materials to a single well rather than both of the operation wells. Therefore, I also performed simulations to evaluate the economic potential for a single well application for an embodiment of my process. Simulation cases for the single well simulations included:

Case 1: exemplary embodiment of a process for fracture conductivity tuning is applied in both producer and injector wells.

Case 2: exemplary embodiment of a process for fracture conductivity tuning is only applied in producer well, e.g., special proppants are placed in fractures near the producer and regular proppants are placed near the injector.

Case 3: exemplary embodiment of a process for fracture conductivity tuning is only applied in injector, e.g., special proppants are placed in fractures near injector and regular proppants are placed near producer.

Case 4: exemplary embodiment of a process for fracture conductivity tuning is not applied in producer or injector, e.g., only conventional proppants are placed in all fractures.

For fracture segments with no exemplary embodiment of a process for fracture conductivity tuning in which fractures are propped with regular, conventional proppants, the value of a is assumed to be 1 and the hydraulic conductivity is assigned as a constant 1 D·cm. For the fracture segments propped with special proppants (e.g. embodiments of ACM proppants), the value of a is assigned with 0.25 and the hydraulic conductivity would vary with temperature.

Figure 17:
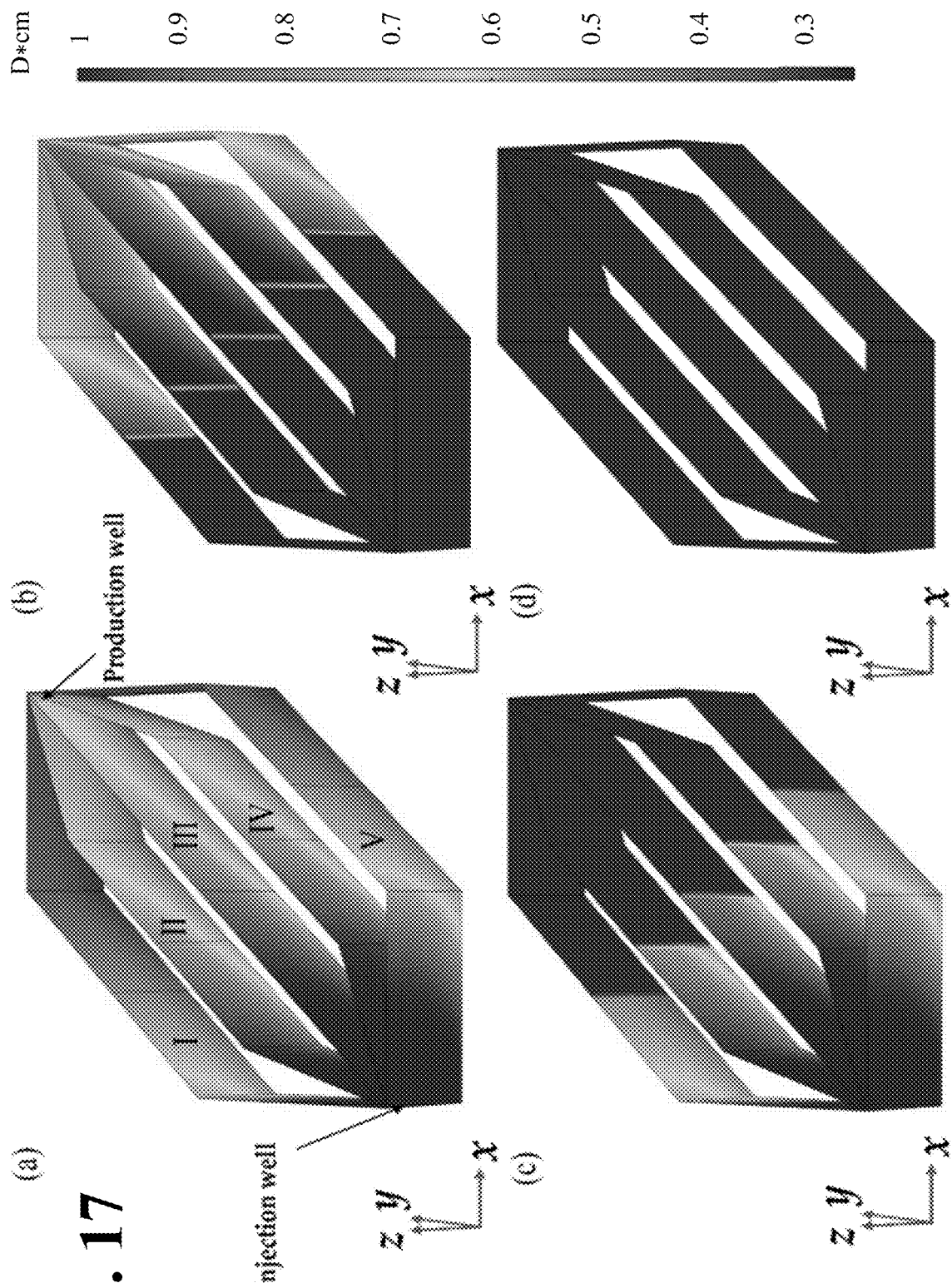
FIG. 17 is a graph illustrating simulation results for fracture conductivity distribution after 50 years of production according to (a) Case 1: all fractures propped with special proppants; (b) Case 2: fractures near producer propped with special proppants; (c) Case 3: fractures near injector propped with special proppants; (d) Case 4: all fractures propped with regular proppants as discussed herein.

FIG. 17 shows the distribution of fracture hydraulic conductivity after 50 years of production. It could be seen that, as long as the process for fracture conductivity tuning or special proppant is applied in the EGS, the overall hydraulic conductivity of fractures I and V are much larger than fracture II, III and IV, which means more working fluids could pass through the fractures I and V.

Figure 18:
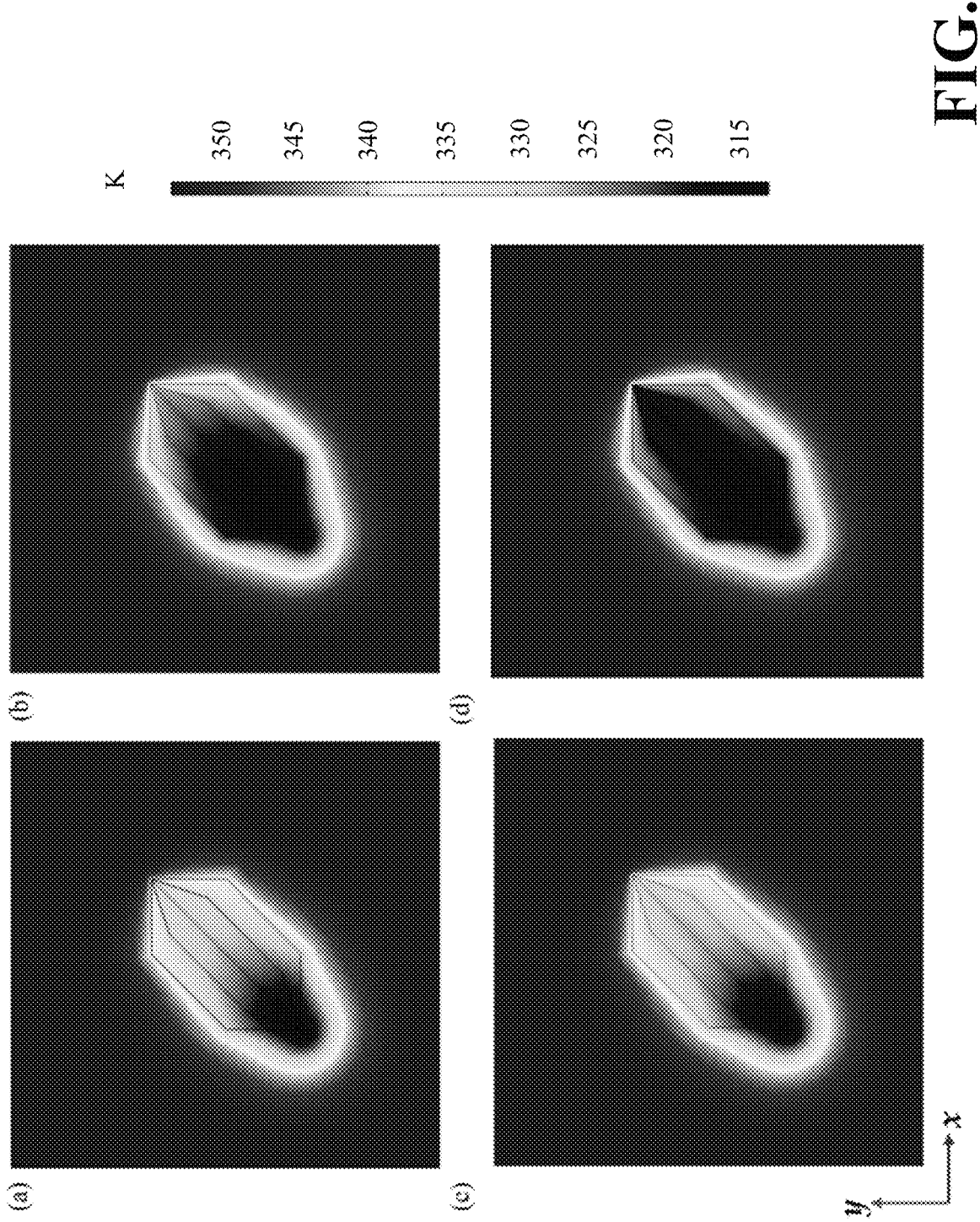
FIG. 18 is a series of graphs illustrating simulated temperature distribution after 50 years of production according to (a) Case 1: all fractures propped with special proppants; (b) Case 2: fractures near producer propped with special proppants; (c) Case 3: fractures near injector propped with special proppants; (d) Case 4: all fractures propped with regular proppants.

FIG. 18 shows the temperature distribution in the reservoir after 50 years of production according to different simulation cases for cases 1-4. By comparing the temperature distribution from case 2 and case 3, it can be seen that case 3 significantly outperforms case 2 in temperature control. Regarding the case 3, even only the fractures near the injector are propped with the temperature sensitive proppants, the temperature distribution in graph (c) shown in FIG. 18 is still similar to the graph of case 1 labeled (a) in FIG. 18, i.e., all fractures apply the special proppants. In other words, even only the injector applies the presented optimization method, it is still highly effective to control the fluid flow in the geothermal system and equalize the flow rate in each fracture. By contrast, in case 2, although temperature near the production well is enhanced by applying the exemplary process for fracture conductivity tuning it still cannot prevent the cold water breakthrough from the injector to the producer. To sum up, this comparison can highlight the effect of the injector when applying embodiments of the presented conductivity tuning technique.

Figure 19:
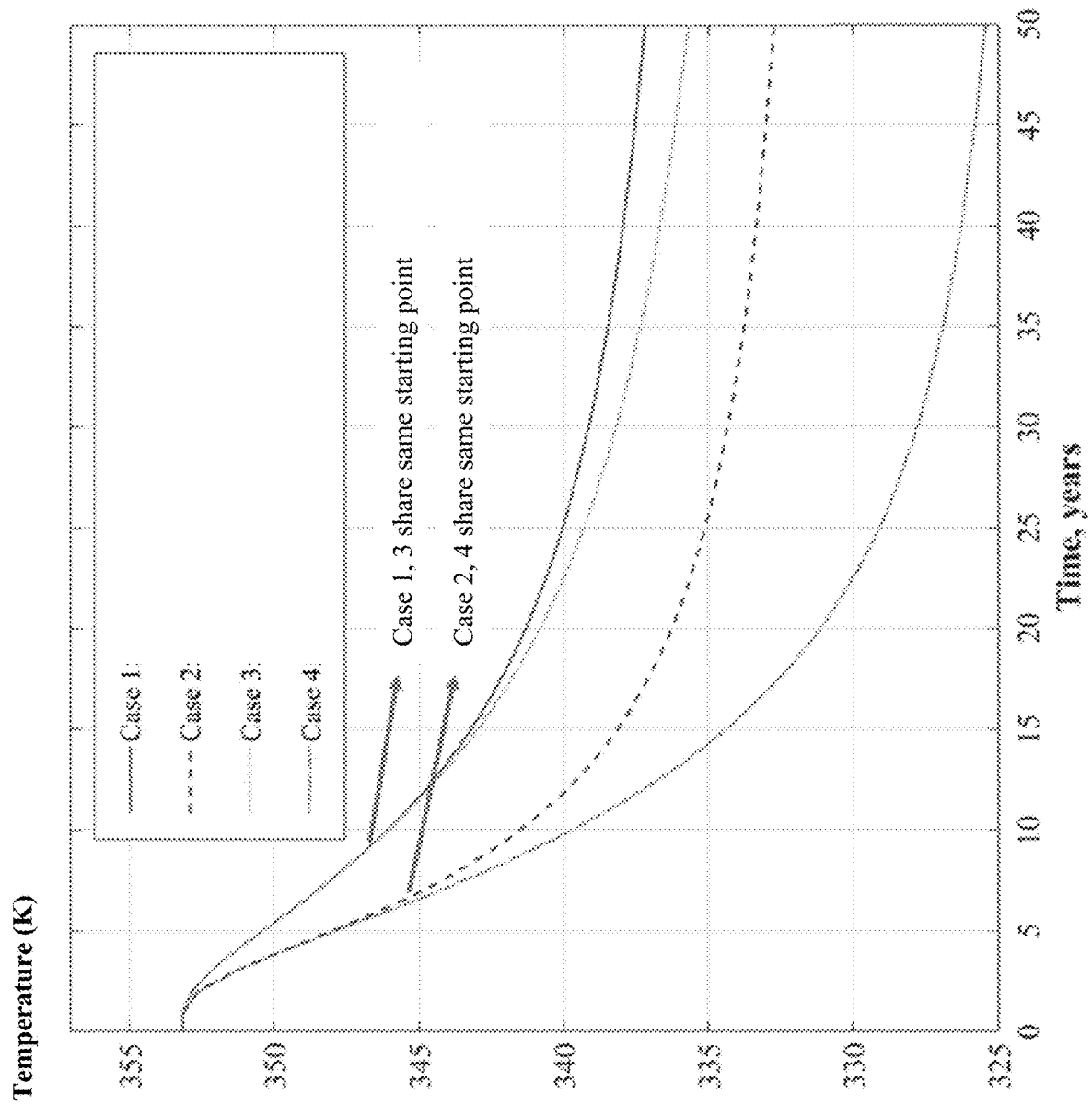
FIG. 19 is a graph illustrating simulation results for temperature of the produced fluid for different simulation cases, which included Case 1: all fractures propped with special proppants; Case 2: fractures near producer propped with special proppants; Case 3: fractures near injector propped with special proppants; and Case 4: all fractures propped with regular proppants.

FIG. 19 presents the quantitatively comparison of temperatures of produced fluid according to the different simulation cases. It could be seen from the comparison that, even when only the exemplary process for fracture conductivity tuning for producer or injector is applied, temperature of produced fluid can still remain over 333K, which is over 7K higher than that without use of the process (Case 4).

Besides, by comparing the temperature of produced fluid curves for different simulation cases, it can be observed that cases 1 and 3 show the same behavior over a period of time, and on the other hand, cases 2 and 4 follow each other. This phenomenon can be explained by the fact that in cases 1 and 3, fractures near injector are propped with special proppants so they share the same response at early production time. By contrast, in cases 2 and 4, fractures near injector are propped with regular proppants so these two cases show similar trend with each other at early production time too. After 50 years of production, temperature of produced fluid from case 3 is 3K higher than that in case 2. In other words, using an embodiment of the process for fracture conductivity tuning at least near the injector well may be more effective than near the producer well, which is consistent with the results in FIG. 18.

Figure 20:
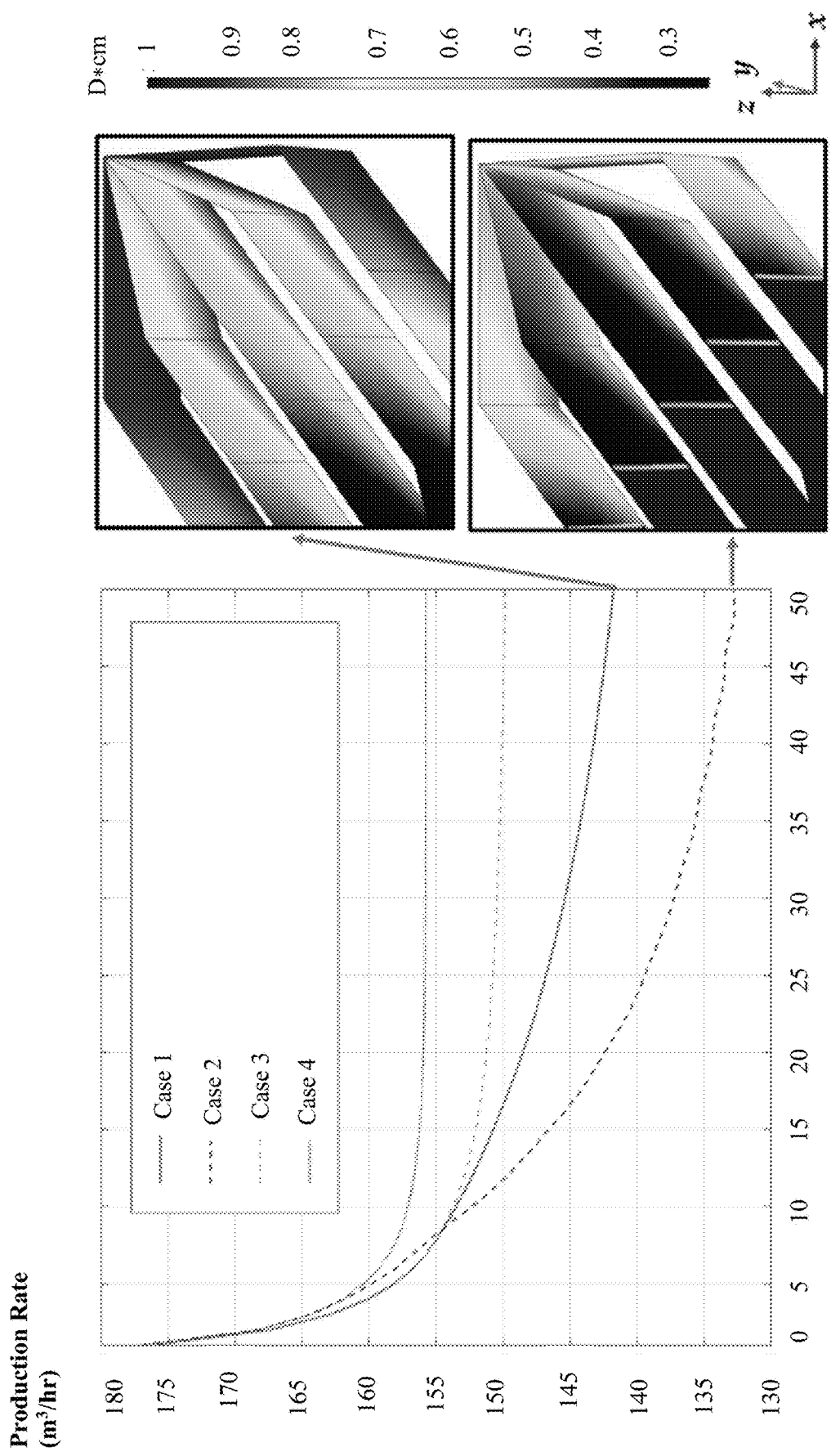
FIG. 20 is a graph illustrating simulation results for production rate for different simulation cases, which included Case 1: all fractures propped with special proppants; Case 2: fractures near producer propped with special proppants; Case 3: fractures near injector propped with special proppants; and Case 4: all fractures propped with regular proppants.

FIG. 20 shows the production rate for different simulation cases. It could be seen that, similar to the FIG. 19, production rates of cases 1 and 3 share the same starting point, and production rates of cases 2 and 4 share the same starting point. Besides, I was surprised to find that, when I only placed the special proppants near the producer well, i.e., case 2, the reduction of the production rate would be larger than case 1, where the special temperature sensitive proppants are utilized along all the fractures. This can be due to the fact that the production rate is dominated by the fracture conductivity near the producer. After 50 years of production, fracture conductivity near producer in case 1 is much larger than that in case 2. Therefore, production rate in case 2 should be smaller than that in case 1. Besides, it can be known that, when the proppants in the fractures are placed near the injector, i.e., case 3, it could not only maintain high production temperature after long-term production, but also could mitigate the loss of production rate caused by the fracture hydraulic conductivity decline.

Figure 21:
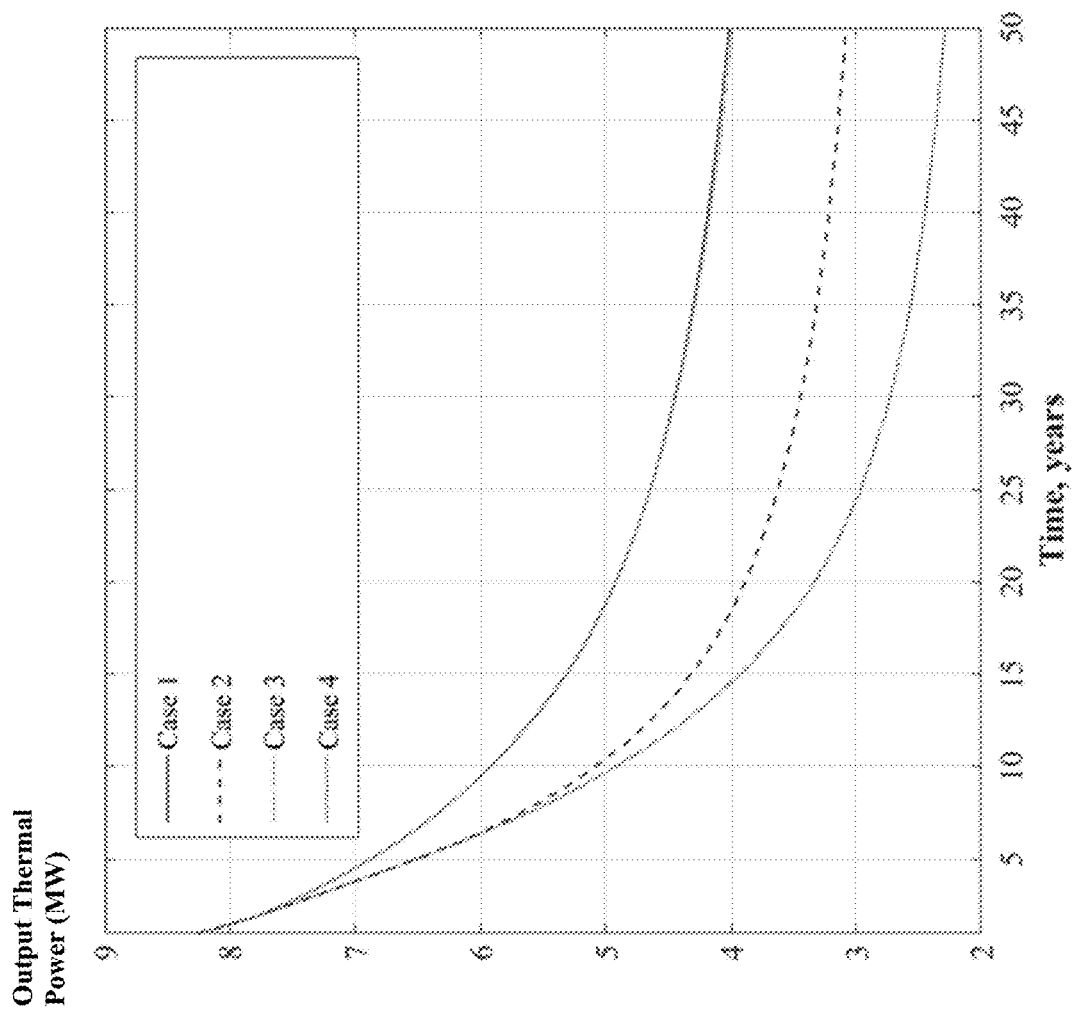
FIG. 21 is a graph illustrating simulation results for output thermal power for different simulation cases, which included Case 1: all fractures propped with special proppants; Case 2: fractures near producer propped with special proppants; Case 3: fractures near injector propped with special proppants; and Case 4: all fractures propped with regular proppants.
Figure 22:
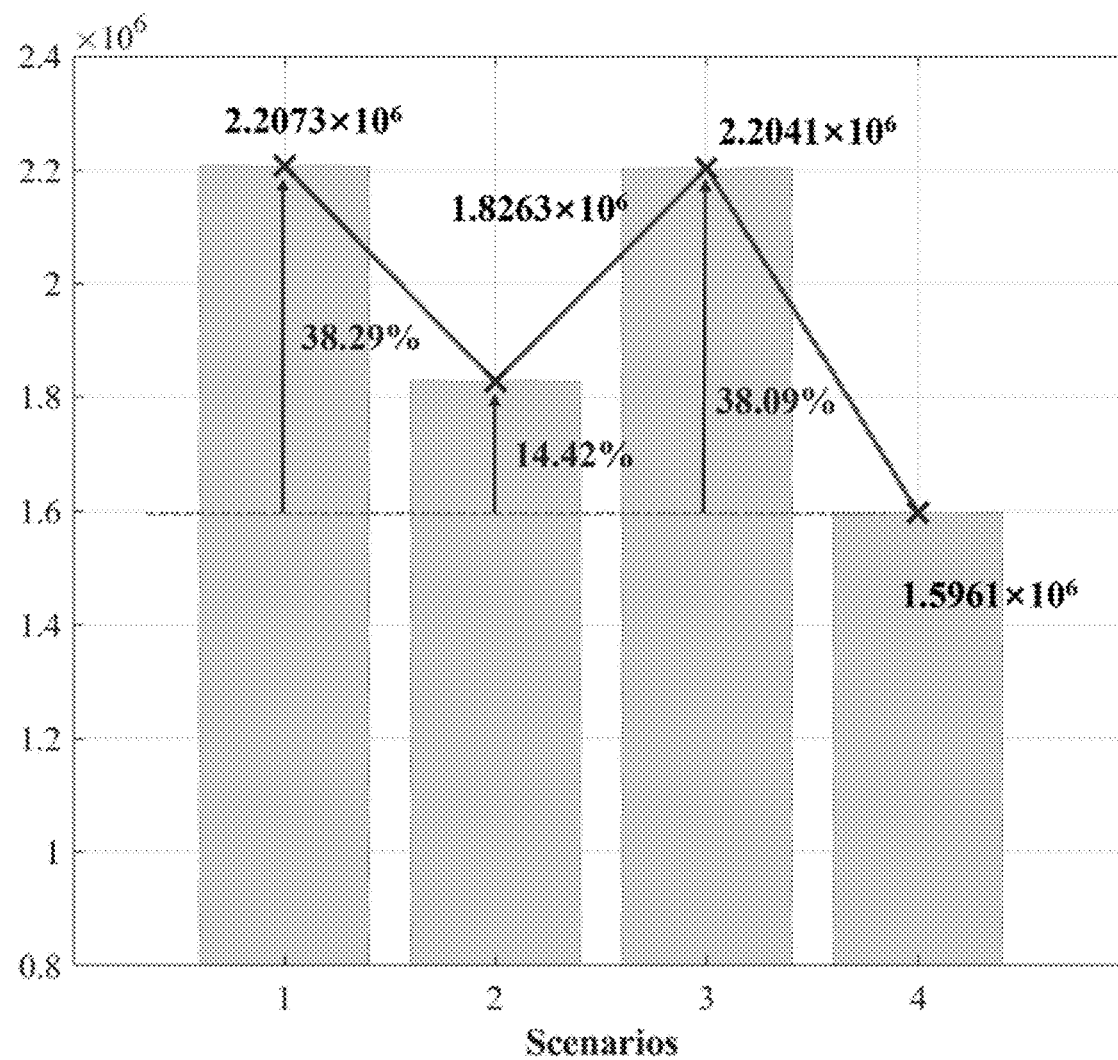
FIG. 22 is a graph illustrating simulation results for cumulative output thermal power for different simulation cases, which included Scenario 1 (Case 1): all fractures propped with special proppants; Scenario 2 (Case 2): fractures near producer propped with special proppants; Scenario 3 (Case 3): fractures near injector propped with special proppants; and Scenario 4 (Case 4): all fractures propped with regular proppants.

FIGS. 21 and 22 present the output thermal power and cumulative output thermal power over 50 years of production. From the comparison, it can be seen that although it was assumed that the special proppants are only applied to the injector, the increase of heat extraction is almost identical to the situation that all fractures propped with special proppants, which is important for the operators to reduce the costs. By applying the presented fracture hydraulic conductivity tuning technique to the injection well, the cumulative output thermal power would be enhanced by 38.09%, from $1.5961 \times 10^6$ MW·hr to $2.2041 \times 10^6$ MW·hr. By contrast, when the new enhancement technique is applied to the producer, the improvement in the heat extraction would be only 14.42%, from $1.5961 \times 10^6$ MW·hr to $1.8263 \times 10^6$ MW·hr. By comparing the results between simulations for case 2 and case 3, more attention can be paid to the injection well when applying the fracture hydraulic conductivity tuning technique. However, it is not recommended to apply this new method only in the production wells under this model conditions.

As discussed above, since special proppants can be more expensive than regular proppants, it is contemplated that operators would like the option of being able to reduce the volume of special proppants and also maintain the improvements that can be provided by an exemplary embodiment of my apparatus or process for fracture conductivity tuning as much as possible. Therefore, a combination of special and regular proppants could be used in some embodiments during the injection stage for each operation well. For instance, some special proppants can be injected as a batch during fracking and the rest of the treatment could be finished with regular proppant injections. Using an embodiment of this method, special proppants can be positioned for placement deep inside the fracture as shown in FIG. 23.

Figure 23:
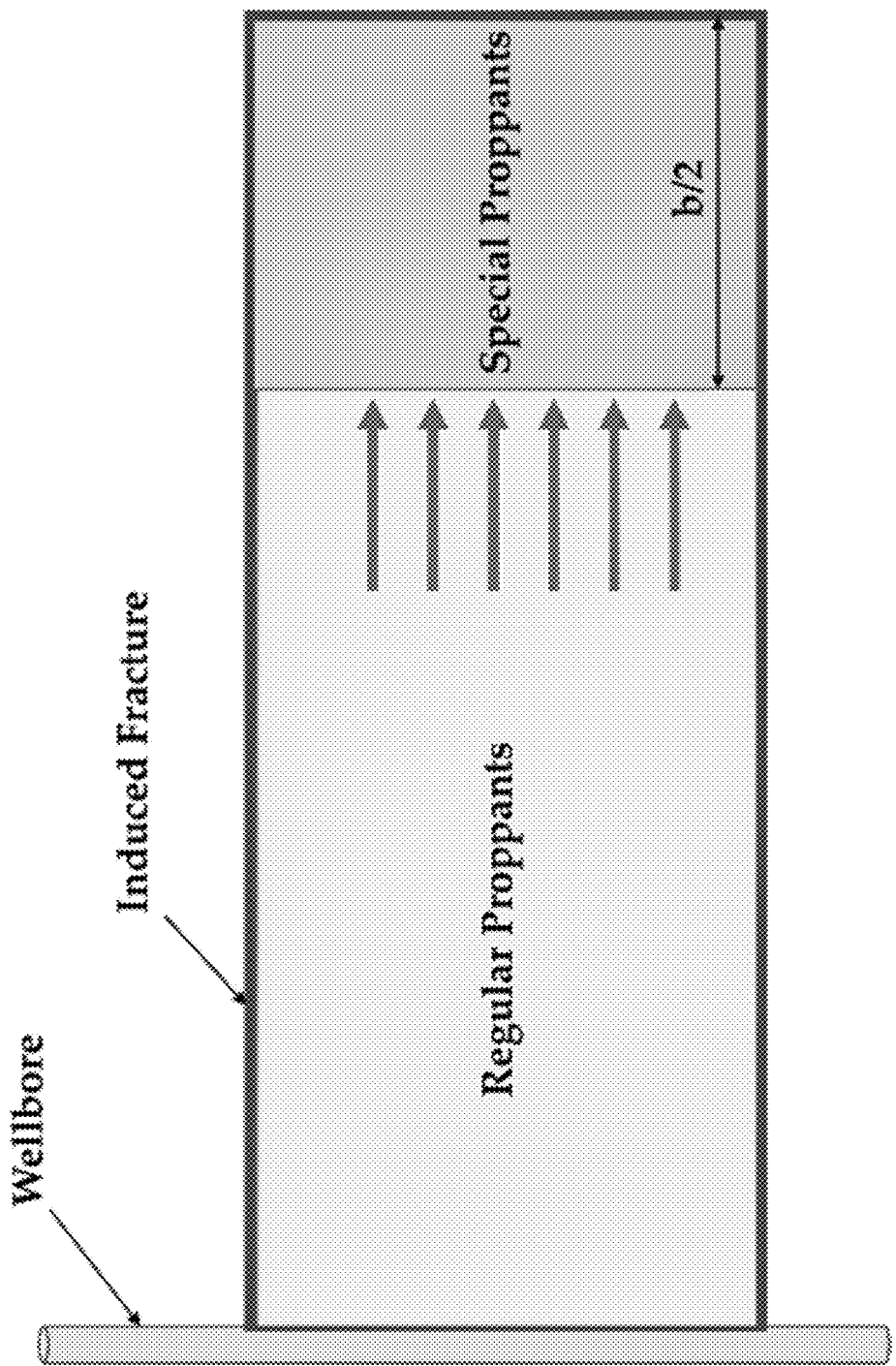
FIG. 23 is a schematic illustrating of an exemplary positioning of proppants according to an exemplary embodiment of the process for fracture conductivity tuning that can be used by an exemplary embodiment of an apparatus for fracture conductivity tuning.
Figure 24:
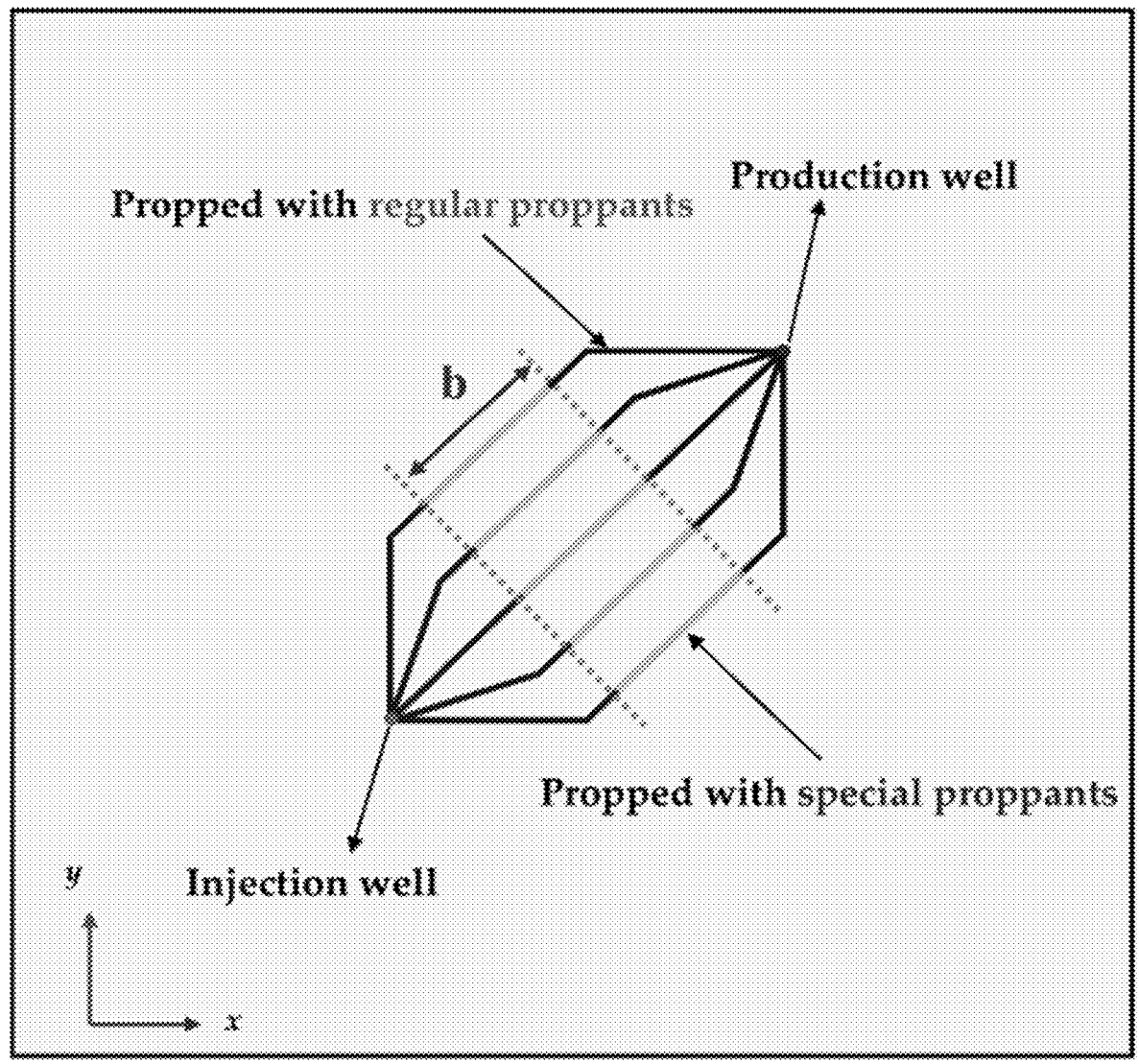
FIG. 24 is a schematic illustration of an exemplary embodiment of the process for fracture conductivity tuning that was subjected to simulation work as discussed herein. The illustration of special proppant placement only along a segment of each of the fractures is shown in region b of FIG. 24 as discussed herein for this exemplary embodiment of the process. The special proppant can be an embodiment of the proppants that can help provide fracture conductivity tuning as discussed herein.

Simulation work was conducted on this model of using the exemplary process of FIG. 23. In this simulation work, it was assumed that the injection stage was finished. The fractures in the middle between the injection well and production well would be propped with special proppants. The rest of fractures would be propped with regular proppants as shown in FIG. 24. In this section, I explain how I studied ways to reduce the consumption of special proppants while also achieving good heat extraction performance. As discussed herein, several simulation schemes are designed as following:

Scheme 1: All fractures are propped with special proppants, i.e., b=well spacing=300 m.

Scheme 2: Fractures with a length of 150 m in the middle area between wells are propped with special proppants, i.e., b=150 m.

Scheme 3: Fractures with a length of 50 m in the middle area between wells are propped with special proppants, i.e., b=50 m.

Scheme 4: All fractures are propped with regular proppants, i.e., b=0 m.

Figure 25:
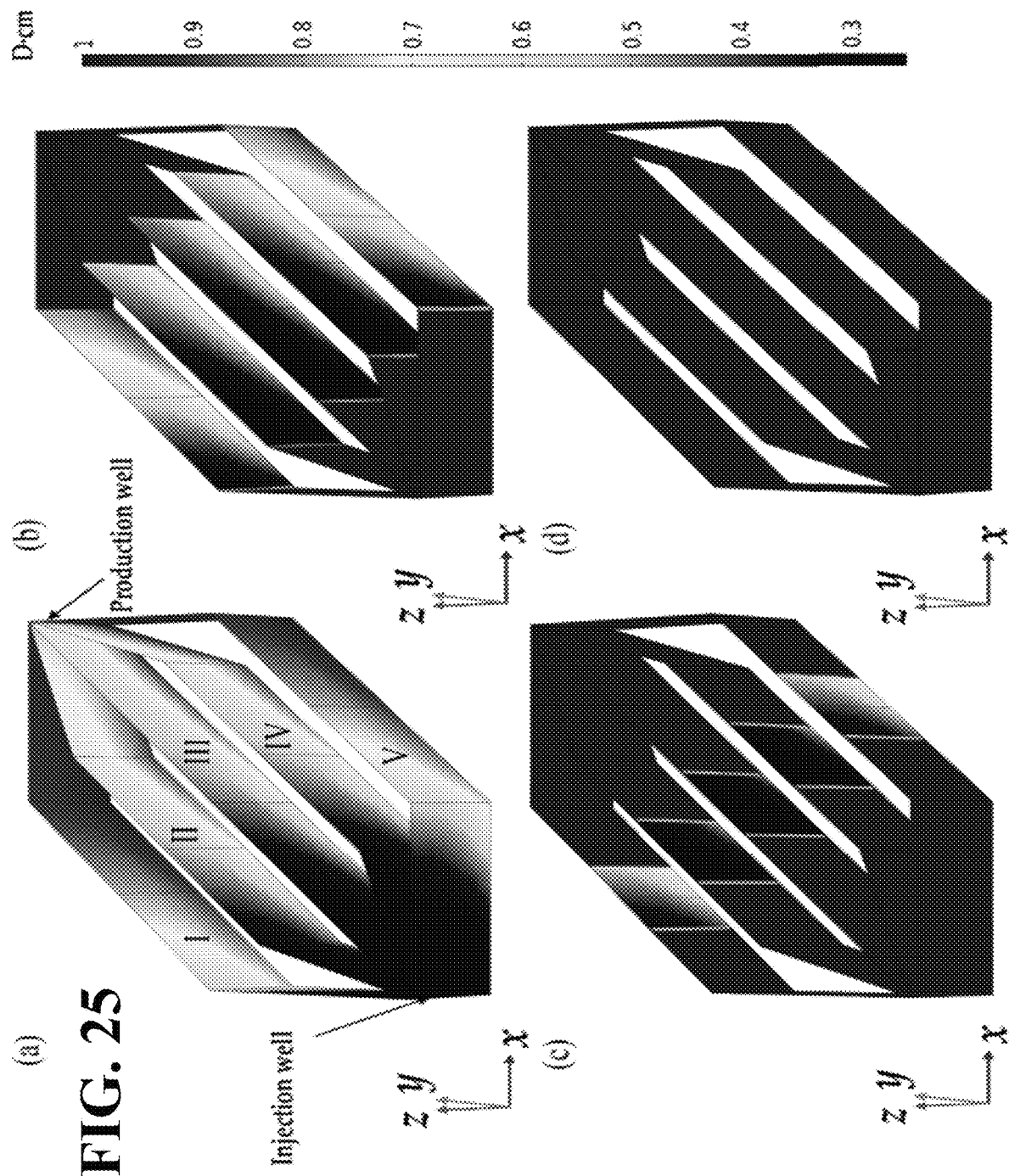
FIG. 25 is a series of graphs illustrating simulation results for the distribution of fracture hydraulic conductivity after 50 years of production for different simulated scenarios (a), (b), (c), and (d), where (a) is scheme 1 where b=300 m; (b)

FIG. 25 shows the distribution of fracture hydraulic conductivity after 50 years of production. It could be seen that, as long as the embodiment of my process or apparatus (e.g. use of special proppant having ACM as discussed herein, etc.) is applied in an EGS, the overall hydraulic conductivity in fractures I and V would be larger than that in fracture II, III and IV, which would let more working fluids pass through the fractures I and V to reach the same resident time across the board.

FIG. 26 presents a comparison of the temperature of produced fluids over 50 years of production according to the different simulation cases. It could be seen that, as the amounts of special proppants used in the system is increasing, the temperature of produced fluid could be significantly increased as well. Even when only 50 m of fractures in the middle is propped with special proppants, i.e., scheme 3: b=50 m, temperature of produced fluid at $50^{th}$ year would still be increased by around 5° K, from 325.45° K to 330.11° K. In other words, even only ⅙ length of fractures are propped with special proppants, fluid flow in each fracture is still effectively controlled by the proposed fracture hydraulic conductivity tuning technique and the placed special proppants could be still effective to optimize the temperature of produced fluid after long-term production.

FIG. 27 shows the comparison of production rate according to different simulation cases. It could be seen that by reducing the amount of the special proppants used here, i.e., scheme 2 and 3, the reduction in the production rate could be mitigated, which is beneficial for the heat extraction from the EGS. After 50 years of production, the production rate for scheme 2: b=150 m could still reach 120.15 m³/hr, which is 2.78% higher than that in scheme 1: b=300 m, i.e., 116.89 m³/hr.

FIGS. 28 and 29 show the output thermal power and cumulative output thermal power over 50 years of production with different value of b. It can be seen that even if the special proppants are only placed in few fracture segments, the presented fracture conductivity tuning technique still make significant difference on the geothermal system production performance. When 150 m of fracture in the middle area is propped with special proppants, i.e., scheme 2: b=150 m, the cumulative output thermal power over 50 years of production could be 2.0384×10⁶ MW·hr, which bring an improvement of 9.86% in heat extraction compared with scheme 4, i.e., b=0 m. Furthermore, even where the special proppants are only applied to only 50 m of fracture in the middle area between injector and producer, the cumulative output thermal power over 50 years of production still reaches 1.8548×10⁶ MW·hr, which still triggers an increase in the heat extraction for 16.21%. In summary, even if the operators use the special proppants mixed with regular proppants, a considerable profit still can be expected.

The simulation results discussed above show that implementation of embodiments of my apparatus and process can provide significant improvements as well as substantial increases in profitability for geothermal system operations.

It should be appreciated that embodiments of my apparatus and process can be configured for autonomous tunning of fracture hydraulic conductivity to enhance the performance of geothermal systems (e.g. an EGS). Implementation can permit there to be high fracture hydraulic conductivity provided in high-temperature zones and low fracture hydraulic conductivity provided in low-temperature zones.

The above discussed simulation results show that utilizing an embodiment can prevent the appearance of dominant flow paths between wells to maintain high production temperature even after long-term production. For example, temperature of produced fluid after 50 years could be 12K higher as compared to situations where an embodiment of the process or apparatus are not used. In some situations as discussed above, cumulative output thermal power can be over 38.29% higher when utilizing an embodiment of my process as compared to use of a conventional system.

Furthermore to evaluate how embodiments of the process and apparatus can work with use of proppants, I evaluated the effectiveness of the proposed temperature-sensitive proppant to adjust the hydraulic conductivity of a hydraulically fractured geothermal system using discrete element methods, finite element methods, and Lattice Boltzmann Methods (LBM). First, I used discrete element methods to create proppant bed sample to be used for the remainder of the analysis. The created proppant sample contains 221 non-spherical particles and represents a 20/40 mesh with a mean particle diameter of 642 μm and a median of 664 μm. The sample has dimensions of 3.79 mm×2.37 mm×5.69 mm (400×250×600 voxels) as shown in FIG. 30.

The initial porosity of the sample is 35.15% and the permeability is 326.17 Darcy. The geometry is meshed with unstructured meshing adopting the best isotropic triangles algorithm to produce equilateral triangles. The final mesh contains 1,804,747 linear tetrahedrons elements.

Finite element methods were used to subject the proppant sample to fracture in-situ conditions such as closure stress and temperature. Few assumptions are made for the performed analysis. The model is assumed to be linearly elastic with a density of 2.65 g/cm3, Young's modulus of 5 GPa, and Poisson's ratio of 0.35. The proppant was assumed to have thermal conductivity of 1.15 W/(m K), thermal expansion coefficient of −5E-04 1/° C., and specific heat of 0.83 J/(g ° C.).

Initially, closure stress of 10 MPa was applied to ensure proper packing and replicates in-situ conditions. In addition, the temperature of the sample is uniformly set to 100° C. The impact of in-situ conditions such as temperature and closure stress and proppant properties such as Young's modulus and thermal expansion coefficient are investigated. Once the deformed geometry is obtained, Lattice Boltzmann Methods is used to simulate fluid flow and compute hydraulic conductivity of the sample. Incompressible flow with a low Reynolds number (Re<1) is simulated with periodic boundary conditions at the inlet and outlet are used. In addition, bounce-back boundary condition is used for the other sides of the model to represent no-slip condition. FIGS. 31-34 shows the change of proppant conductivity with the change in the abovementioned parameters.

In FIG. 31, temperature of the proppant increased gradually up to a value of 180° C., which represents an increase of 80° C. while holding other involving parameters constant.

The conductivity of the sample increased by approximately 21% upon increasing the temperature by 80° C.

FIG. 32 shows the influence of thermal expansion coefficient on the proppant conductivity. The maximum increase in conductivity was achieved when using a coefficient of −7E-04 1/° C., representing an increase in the proppant conductivity by 38.7%. The impact of in-situ closure stress on proppant conductivity is shown in FIG. 33. The conductivity decreases closure stress was increased. Upon increasing the temperature of the proppant by 80° C. at a closure stress of 60 MPa, the conductivity increased by 22.3%.

FIG. 34 shows the influence of the proppants Young's modulus on its hydraulic conductivity. A higher Young's modulus is observed to result in a high increase in fracture conductivity. A proppant with a Young's modulus of 20 GPa shows an increase of 22.5% in its hydraulic conductivity compared to an increase of 16.98% for a proppant with a Young's modulus of 2 GPa with 80° C. increase in temperature.

Simulation results and other experimental results discussed above also showed that embodiments that are utilized to provide thermally adjustable proppants near the injector well can permit cumulative heat extraction after 50 years to be 38.09% higher than a conventional case. Moreover, embodiments that are adapted so that thermally adaptive proppants are utilized only in a middle segment between the injection and producer wells can still be effective to control the fluid flow in the reservoir and enhance energy harvesting. These findings confirm my belief that significant improvements in energy production can be harvested in geothermal systems by using an embodiment of my process or apparatus for autonomous tunning of fracture hydraulic conductivity.

Nomenclature

Parameter Definition, unit
$c_f$ Heat capacity of working fluid, J/(kg·K)
$c_{fr}$ Compressibility coefficient of the porosity of fracture, 1/Pa
$c_m$ Compressibility coefficient of the reservoir matrix, 1/Pa
$c_s$ Heat capacity of solid phase, J/(kg·K)
$d_f$ Fracture aperture, m
g Gravitational acceleration, m/s$^2$
$k_m$ Permeability of reservoir matrix, m$^2$
$k_f$ Permeability of fracture, m$^2$
p Reservoir pore pressure, Pa
$p_f$ Fracture pore pressure, Pa
$p_i$ Initial reservoir pore pressure, Pa
$p_w$ Bottomhole pressure, Pa
t Time, s
T Temperature, ° K
$T_i$ Initial reservoir temperature, K
$T_{inj}$ Temperature of injected fluid, K
$T_w$ Temperature of injected fluid, K
u Vector of Darcy's seepage velocity in reservoir matrix, m/s
$u_f$ Vector of Darcy's seepage velocity in fracture, m/s
Greek
$\rho_f$ Density of working fluid, kg/m$^3$
$\lambda_{eff}$ Effective heat conductivity, W/(m·K)
$\lambda_f$ Heat conductivity of working fluid, W/(m·K)
$\lambda_s$ Heat conductivity of solid phase, W/(m·K)
$\phi_f$ Porosity of fracture, dimensionless
$\phi_m$ Porosity of reservoir matrix, dimensionless
$\mu_f$ Viscosity of working fluid, Pa s
$\partial\Omega_1$ Reservoir outer boundary, dimensionless
$\partial\Omega_2$ Reservoir inner boundary, dimensionless
Abbreviations
Abbreviation Full name
BVP Boundary value problem
EGS Enhanced geothermal system
FEM Finite element method
MMS Method of manufactured solution
MUMPS Multifrontal massively parallel sparse direct solver It should be appreciated that the exemplary embodiments discussed herein can be adjusted to account for a particular set of design criteria. For example, the type of ACM material or thermally sensitive proppant utilized in a particular embodiment can be adapted to account for a particular set of design criteria that can include geological system conditions, power generation equipment requirements, and other design considerations. Also, additional elements can be included in embodiments to help meet a particular set of design criteria. The number of steam turbines, injection wells, production wells, and/or fractures can be adapted to meet a particular set of design criteria, for example. As yet another example, the number of compressors, pumps, type of conduits or conduit arrangements, and other process elements that may be utilized can be adapted to meet a particular set of design criteria. Thus, while certain present preferred embodiments of my proppants, ACM, apparatuses and processes for fracture conductivity tuning, and embodiments of methods for making and using the same have been shown and described above, it is to be distinctly understood that the invention is not limited thereto but may be otherwise variously embodied and practiced within the scope of the following claims.

What is claimed is:

1. A method of fracture conductivity tuning comprising:
positioning elements in a geological system for adjustable hydraulic conductivity based on surrounding temperature of fractures within a subsurface of the geological system to provide a uniform or substantially uniform heat extraction via working fluid passing through the fractures;
wherein the elements comprise thermally sensitive proppants and/or adjustable clogging material (ACM), wherein the thermally sensitive proppants comprise calcium carbonate, one or more shape memory polymers, and/or at least one metal, and wherein the ACM comprises one or more inorganic salts, one or more polymers and/or one or more organic salts; and
wherein the elements are placed in the fractures and at least one injection well in fluid communication with the fractures.

2. The method of claim 1, wherein the elements are thermally sensitive proppants and the positioning of the elements in the geological system comprises injecting the thermally sensitive proppants into the fractures, at least one injection well in fluid communication with the fractures, and/or at least one production well in fluid communication with the fractures.

3. The method of claim 2, wherein the thermally sensitive proppants are configured so that the thermally sensitive proppants deform to expand when the surrounding temperature is below a first pre-selected maximum temperature for a first temperature zone and are configured to be smaller when at a second pre-selected temperature that is above a second pre-selected minimum temperature for a second temperature zone.

4. The method of claim 3, wherein the first temperature zone is a lower temperature zone, the second temperature zone is a higher temperature zone and the thermally sensitive proppants comprise calcium carbonate.

5. The method of claim 4, wherein the thermally sensitive proppants remain at a first size when the surrounding temperature is at the second pre-selected temperature and are enlarged to have a second size that has a greater volume than the first size when the surrounding temperature is below the first pre-selected maximum temperature for the first temperature zone.

6. The method of claim 4, wherein deformation of the thermally sensitive proppants is configured to occlude the fractures and diminish or reduce hydraulic conductivity when the surrounding temperature is in the first temperature zone.

7. The method of claim 2, wherein the thermally sensitive proppants are injected into the at least one injection well.

8. The method of claim 2, wherein the thermally sensitive proppants are injected into the at least one production well.

9. The method of claim 2, wherein the thermally sensitive proppants are injected into the fractures.

10. The method of claim 2, wherein the thermally sensitive proppants are injected into the fractures and the at least one injection well.

11. The method of claim 2, wherein the thermally sensitive proppants are injected into the fractures and the at least one production well.

12. The method of claim 2, wherein the thermally sensitive proppants are thermally sensitive coated proppants.

13. The method of claim 2, wherein the thermally sensitive proppants are thermally sensitive proppants that are injected and the method also comprises:
    injecting additional proppants.

14. The method of claim 1, wherein the geological system is an enhanced geothermal system (EGS) or a geothermal system.

15. The method of claim 1, wherein the elements include the ACM, the ACM having a temperature sensitive solubility such that the ACM is in a solution state when at or above a first temperature and in a solid state at or below a second temperature; and
    wherein the positioning of the elements in the geological system comprises injecting the ACM into the fractures, at least one injection well in fluid communication with the fractures, and/or at least one production well in fluid communication with the fractures.

16. The method of claim 15, comprising:
    the ACM forming at least one lining in the fractures when the surrounding temperature is at or below the first temperature; and
    the at least one lining dissolving when the surrounding temperature is at or above the second temperature.

17. An apparatus for fracture conductivity tuning comprising:
    at least one injection well;
    fractures communicatively connected to the at least one injection well such that a working fluid injectable via the at least one injection well passes through the fractures to at least one production well; and
    thermally expansive elements being positioned in the at least one injection well and the fractures to adjust fracture conductivity of heat to the working fluid, the thermally expansive elements configured to solidify to a solid or enlarge from a first size to a second size to have a greater volume when at a temperature that is below a first pre-selected temperature and the thermally expansive elements are configured to liquify or be at their first size when at a temperature that is above a second pre-selected temperature, the second pre-selected temperature being greater than the first pre-selected temperature;
    wherein the thermally expansive elements comprise thermally sensitive proppants and/or adjustable clogging material (ACM), wherein the thermally sensitive proppants comprise calcium carbonate, one or more shape memory polymers, and/or at least one metal, and wherein the ACM comprises one or more inorganic salts, one or more polymers and/or one or more organic salts.

18. The apparatus of claim 17, wherein the first pre-selected temperature is a defined maximum temperature for a first zone of conductivity and the second pre-selected temperature is a defined minimum temperature for a second zone of conductivity, conductivity of the second zone being greater than conductivity of the first zone.

19. The apparatus of claim 17, wherein the thermally expansive elements include proppants comprised of calcium carbonate and/or are the ACM, the ACM having a temperature sensitive solubility.

20. The apparatus of claim 19, wherein the thermally expansive elements include the ACM, the ACM having the temperature sensitive solubility such that the ACM forms at least one lining in the fractures when the surrounding temperature is at or below the first pre-selected temperature and the at least one lining dissolves when the surrounding temperature is above the second pre-selected temperature.

21. The apparatus of claim 17, wherein the thermally expansive elements include the thermally sensitive proppants, each of the thermally sensitive proppants being comprised of a thermally sensitive coating that covers a body of the proppant.

22. The apparatus of claim 17, wherein the thermally expansive elements include the thermally sensitive proppants.

* * * * *